US00RE34083E

United States Patent [19]

Kawamura et al.

[11] E Patent Number: Re. 34,083

[45] Reissued Date of Patent: Sep. 29, 1992

[54] CAMERA WITH MOTORIZED FILM REWINDING DEVICE

[75] Inventors: Masaharu Kawamura; Yoshihito Harada; Ryuichi Kobayashi; Masayuki Suzuki, all of Kanagawa; Tsunemasa Ohara; Yoichi Tosaka, both of Tokyo, all of Japan

[73] Assignee: Canon Kabushiki Kaisha, Tokyo, Japan

[21] Appl. No.: 540,192

[22] Filed: Jun. 19, 1990

Related U.S. Patent Documents

Reissue of:

[64] Patent No.: 4,752,793
Issued: Jun. 21, 1988
Appl. No.: 945,359
Filed: Dec. 22, 1986

[30] Foreign Application Priority Data

Dec. 26, 1985 [JP] Japan ..... 60-29668
Jan. 30, 1986 [JP] Japan ..... 61-016756

[51] Int. Cl.[5] ..... G03B 1/18

[52] U.S. Cl. ..... 354/173.11

[58] Field of Search ..... 354/173.1, 173.11

[56] References Cited

U.S. PATENT DOCUMENTS 4,324,469 4/1982 Harvey ..... 354/214
4,641,935 2/1987 Umezu et al. ..... 354/173.11
4,679,926 7/1987 Suzuki et al. ..... 354/173.11
4,707,095 11/1987 Nakano et al. ..... 354/173.11
4,814,813 3/1989 Yamamoto et al. ..... 354/418
4,967,217 10/1990 Yamamoto et al. ..... 354/173.11

*Primary Examiner*—Michael L. Gellner
*Attorney, Agent, or Firm*—Robin, Blecker, Daley & Driscoll

[57] ABSTRACT

A camera having film feed detection means the signal of which varies with the rotation of a rotary detection wheel arranged in between a spool and a film cartridge chamber to follow the rewinding movement of the film and a motorized film rewinding device which rewinds the film by means of a motor is provided with change-over means for changing, according to the output of selection means, the period of time before bringing the motor to a stop after the output of the film feed detection means ceases to vary.

22 Claims, 15 Drawing Sheets

CAMERA WITH MOTORIZED FILM REWINDING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a camera having a motorized film rewinding device which is arranged to rewind a film with a motor and to automatically bring the operation of the motor to a stop upon completion of film rewinding.

2. Description of the Related Art

Film rewinding can be performed in two different modes. One is a method of taking up the film completely into a film cartridge. The other is a method of incompletely taking up the film into the cartridge leaving a leader part of the film outside of the cartridge. The former film rewinding mode is advantageous with respect to that it readily permits a discrimination between a used roll of film and a new roll of film. However, it is a disadvantage of the former that the film cannot be taken out for a developing process without breaking the cartridge. Meanwhile, it is an advantage of the latter that the film can be readily taken out by just pulling the leader part in developing the film without breaking the cartridge. It is the photographer's liking to make a choice between the two different film rewinding modes.

In a known camera which has been disclosed in Japanese Laid-Open Patent Application No. SHO 57-211131, a switch is arranged in a spool chamber of the camera to be changed from one position over to another according to the presence or absence of the film within the spool chamber and, in carrying out film rewinding with a motor, two different lengths of time after the change-over of the switch position are arranged to be selectable for controlling the end of film rewinding in one of the above-stated two different modes. According to this arrangement, however, in the case of the mode of leaving the leader part of the film outside of the cartridge, there is such a possibility that the photographed frame portions of film might accidentally be pulled out of the cartridge when the back lid of the camera is opened for taking out the cartridge from the camera in the event of incomplete disengagement of a sprocket from the perforation of the leader part of film. In the worst possible case, all the frame positions of film might be exposed to light with the cartridge dropped off the camera leaving the leader part perforation in a state of engaging the sprocket.

Further, in the conventional camera of the kind arranged to have the film movement monitored by detection means for automatically bringing a motor to a stop upon completion of film rewinding with the motor and to have the driving action of the motor automatically brought to a stop in case that the output state of the detection means fails to come to change after the lapse of a given period of time set by a timer, the film must be firmly and tightly wound round a take-up reel disposed within the cartridge. If not, when the film is rewound after photographing for a number of frames less than the total number of photographable frame portions of the film; a predetermined timer time might be wasted while a coiled part of the film tightens within the cartridge and then the motor might automatically come to a stop before the film is adequately rewound. This trouble often happens particularly in the case of 12- or 24-exposure film products.

On the other hand, Japanese Laid-Open Patent Application No. SHO 60-52834 has disclosed a camera which is arranged to have a relatively long timer time to sufficiently allow a film coil to tighten before the film begins to move and to change the long timer time over to a relatively short timer time when the film begins to move, so that completion of film rewinding can be detected in a short period of time.

Meanwhile, there is the desire to have the film incompletely rewound into the cartridge leaving the leader part of film left outside the cartridge, because it facilitates developing work when the work is to be done by the photographer.

It may appear to be possible to meet this requirement by the camera proposed in the above-stated Japanese laid-open patent application to public inspection by adjusting the above-stated relatively short timer time after commencement of film movement to such a length of time that enables the leader part of film to completely disengage a sprocket provided with film movement detecting means but not to be pulled into the cartridge. However, unstable acceleration of film movement at the build-up of the film rewinding process results in a variable length of time before stabilization of the film moving speed. The output state of the detecting means, therefore, might stay unchanged under the low speed condition before the stabilization of speed while the timer time is lapsing. In that event, the film winding action automatically comes to a stop when only a portion of the film is rewound.

SUMMARY OF THE INVENTION

It is an object of this invention to provide a camera having a motorized film rewinding device which, in rewinding the film back into a film cartridge with a motor, is not only capable of leaving the whole of the leader part of the film outside of the cartridge but is also capable of leaving only a small portion of the leader part outside of the cartridge.

A camera having a motorized film rewinding device embodying one aspect of this invention is arranged to be capable of selecting either one film rewinding mode in which the leader part of the film is completely taken up into a film cartridge or another mode in which the leader part is left outside of the cartridge and is arranged to ensure that a photographed film will never be accidentally exposed to light.

A camera having a motorized film rewinding device embodying one aspect of this invention is arranged to be capable of preventing the leader part of a film from being taken up into a film cartridge in rewinding the film and to be capable of completion of film rewinding.

The above and other objects and features of the invention will become apparent from the following detailed description of embodiments thereof taken in connection with the accompanying drawings.

DETAILED DESCRIPTION OF PREFERRED EMBODIMENTS

Among the accompanying drawings, FIGS. 1 to 5 show the mechanical arrangement of a camera which is applicable in common to both first and second embodiments of this invention described later herein.

Figure 1:
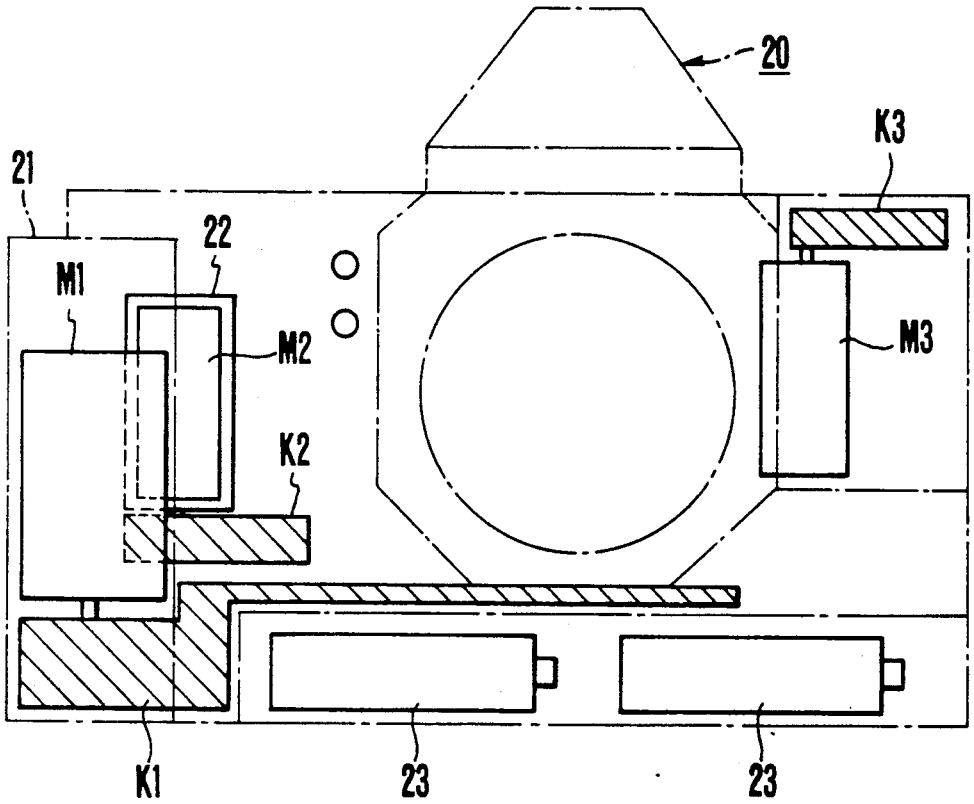
FIG. 1 is a front view of a camera embodying this invention.

FIG. 1 shows how three electric motors M1 to M3 are arranged within a camera housing as viewed from the front thereof. The charge motor M1 governs charging of a shutter, a diaphragm adjusting mechanisms, a diaphragm drive mechanism and a mirror mechanism, and is put in a left hand front corner of the camera 20 as viewed from the front. As for the charge motor M1, though the load change due to the environmental factors is small, a relatively large driving torque is required, because the absolute load is large. Hence, it takes necessarily a large size. From this reason, the left hand front corner is protruded in the form of a grip 21 to create therein a space the charge motor M1 occupies. K1 is a charge transmission system for the charge motor M1. The windup motor M2 occupies a space within a spool structure 22 and is arranged adjacent to a windup transmission system K2. The rewind motor M3 has its place near a cartridge chamber on the right hand side of a mirror box, and is arranged adjacent to a rewind transmission system K3. An electrical power source 23 consists of four AA type batteries.

Figure 2:
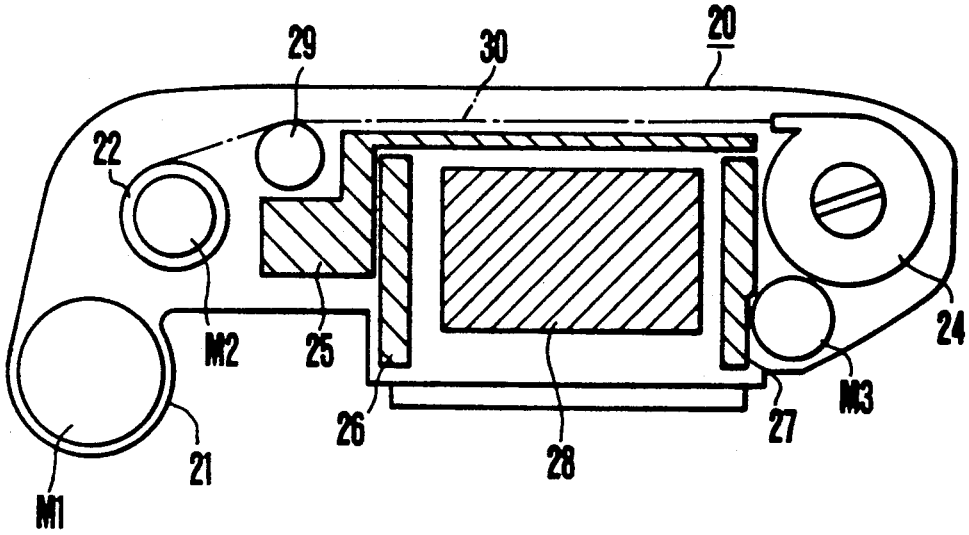
FIG. 2 is a plan view of the same camera.

FIG. 2 is a plan view seen from the above of the camera 20 of the arrangement of the motors M1 to M3 along with a film cartridge 24, a blade type vertically running shutter 25, a mirror mechanism 26, an adjusting mechanism 27 for a diaphragm in a lens mounting, a drive mechanism 28 for the diaphragm and a sprocket structure 29 for indexing the fed amount of film 30.

Figure 3:
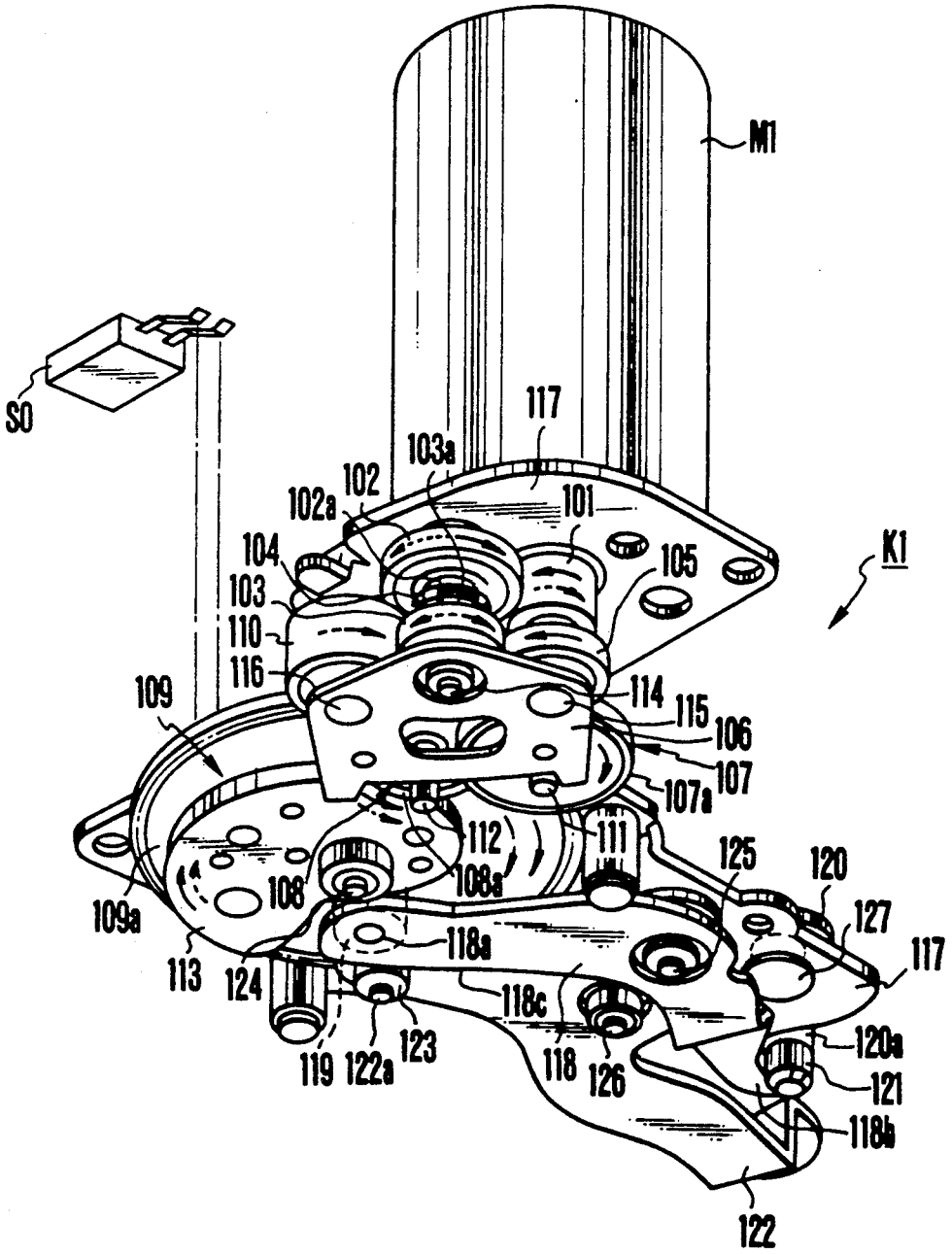
FIG. 3 is an oblique view of a charge transmission system.

In FIG. 3, there is shown the detail of the charge motor M1 and the charge transmission system K1.

A pinion gear 101 is fixed to the output shaft of the charge motor M1, and meshes with a gear 102. The gear 102 and a gear 103 constitute a 2-stage gear, and are each rotatably mounted on a common shaft 114 planted on a base plate 117. Protruded portions 102a and 103a are formed on the gears 102 and 103 respectively, alternating with each other in directions of thrust. By the engagement of these protruded portions 102a and 103a, the gears 102 and 103 move together in engagement in the direction of rotation, but freely move relative to each other in the directions of thrust. Meanwhile, the gear 103 has a surface in contact with a planetary lever 106 pivotal about the shaft 114 and frictionally contacts with the planetary lever 106 by a compression spring 104 arranged between the gears 102 and 103. Thereby, the planetary lever 106 followingly rotates in the direction of rotation of the gear 103. A gear 105 is rotatably mounted on a shaft 115 planted on the planetary lever 106 and always meshes with the gear 103. A 2-stage gear 107 has a large gear 107a and a small gear (not shown) fixedly formed on the upper surface of the gear 107a and is rotatably mounted on a shaft 111 planted on the base plate 117. When the gear 103 rotates in a clockwise direction, and the gear 105 rotates in a counterclockwise direction (indicated by arrow), the planetary lever 106 is turned in the clockwise direction, bringing the large gear 107a into engagement with the gear 105. A gear 108 is rotatably mounted on a shaft 112 planted on the base plate 117 and consists of a large gear 108a and a small gear (not shown) fixedly formed on the upper surface thereof. The large gear 108a always meshes with the small gear of the gear 107. A gear 110 is rotatably mounted on a shaft 116 on the planetary level 106 and always meshes with the gear 103. When the gear 103 rotates in the counterclockwise direction and the planetary lever 106 turns in the counterclockwise direction, the gear 110 meshes with the large gear 108a. A cam gear 109 is rotatably mounted on a shaft 124 planted on the base plate 117, and has a gear 109a and a cam 113 formed thereon. The gear 109a always meshes with the small gear of the gear 108.

Such a transmission system from the pinion 101 to the cam gear 109 is changed over between two speed reduction ratios depending on the direction of rotation of the motor M1. That is, when the charge motor M1 rotates in the counterclockwise direction, all the parts rotate in a direction indicated by a solid line arrow with the planetary lever 106 turning in the clockwise direction to establish a lower speed gear train of large reduction ratio: the pinion gear 101→the gears 102, 103→the gear 105→the gear 107 (large gear 107a, small gear)→the gear 108 (large gear 108a, small gear)→the cam gear 109. Conversely when the charge motor M1 rotates in the clockwise direction, all the parts except the cam gear 109 rotate in the reverse direction indicated by a dashed line arrow, and the planetary lever 106 turns in the counterclockwise direction to establish another or high speed gear train of small reduction ratio: the pinion 101→the gear 102, 103,→the gear 110→the gear 108 (large gear 108a, small gear)→the cam gear 109. For note, these two gear trains are so arranged that the cam gear 109 always rotates in the clockwise direction regardless of which direction the rotation of the charge motor M1 takes.

A first shutter charge lever 118 is pivotally mounted on a shaft 125 planted on the base plate 117 and has one end on which is rotatably mounted a roller 119 about a shaft 118a, the other end of which is formed to a cam 118b. The roller 119 runs on the outer periphery or camming surface of the cam 113 of the cam gear 109, giving the first shutter charge lever 118 a swinging movement that follows the displacement of the camming surface. And, this swinging movement causes the cam 118b also to swing. A second shutter charge lever 120 is rotatably mounted on a shaft 127 planted on the base plate 117, and has a roller 121 rotatable about a shaft 120a. The roller 121 is in engagement with the cam 118b so that the second shutter charge lever 120 can be swung by the swinging of the first shutter charge lever 118. And, the second shutter charge lever 120 charges a publicly known shutter mechanism (not shown).

A lever 122 for charging a publicly known aperture adjusting mechanism, a mirror operating mechanism and a drive mechanism for the diaphragm in a lens mounting, is rotatably mounted on a shaft 126 planted on the base plate 117, and has one end on which a roller 123 is rotatably mounted about a shaft 122a. This roller 123 is in engagement with a cam 118c of the first shutter charge lever 118. Therefore, the lever 122 also swings as the first shutter charge lever 118 swings, thereby the aperture adjusting mechanism, the mirror operating mechanism and others are charged.

A contact member S0 constitutes a switch together with a pulse signal substrate fixed to the cam gear 109 and (not shown) having a comb-like electrically conductive pattern thereon. This switch detects a point in time a little earlier than when the charging by the charge motor M1 is complete.

Figure 4:
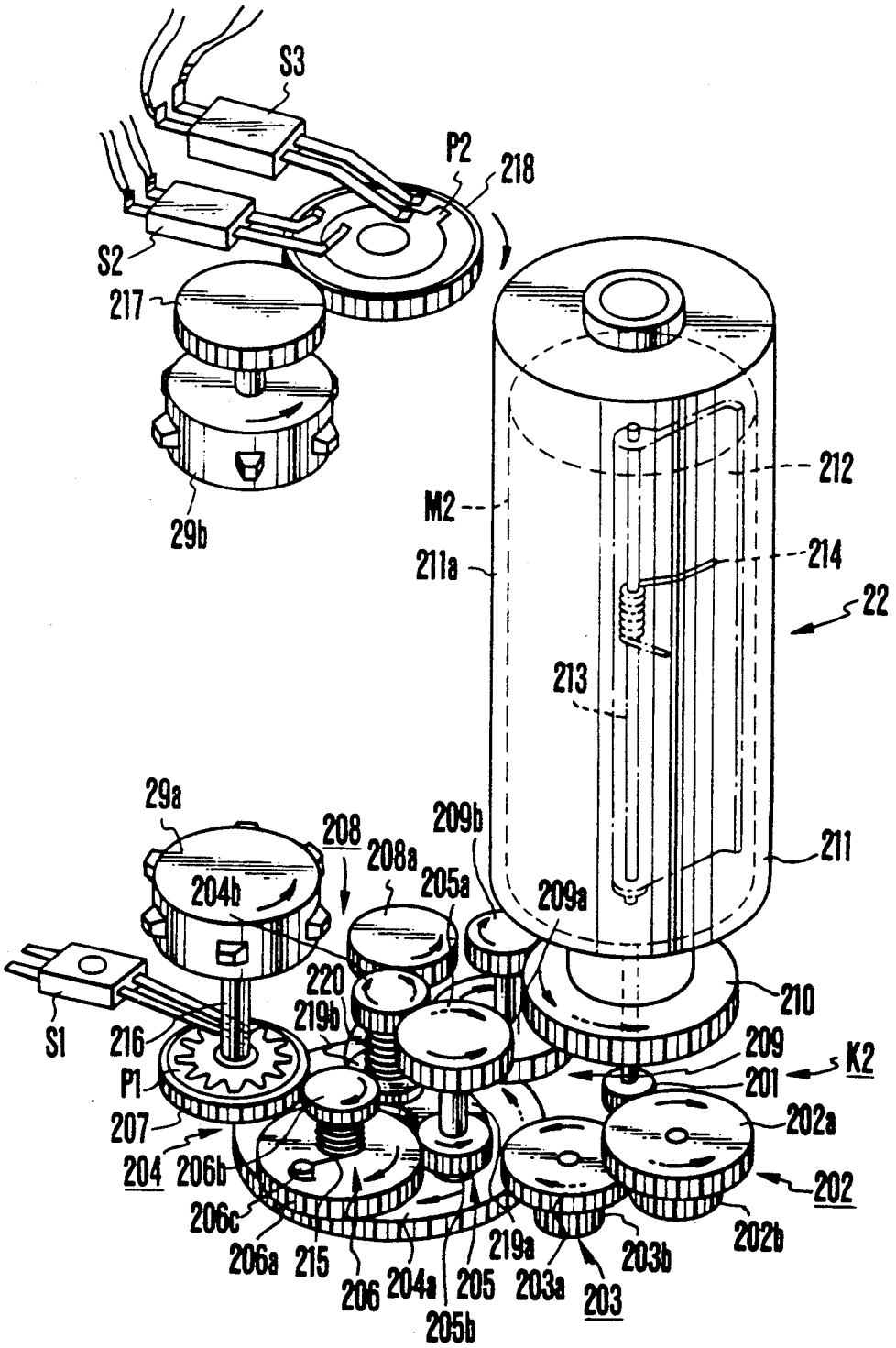
FIG. 4 is an oblique view of a windup transmission system.

In FIG. 4 there is shown the detail of the windup motor M2 and the windup transmission system K2.

A pinion 201 is fixed to the output shaft of the windup motor M2 arranged in the interior of the spool structure 22. A 2-stage gear 202 has a large gear 202a and a small gear 202b, and is rotatably mounted. The large gear 202a meshes with the pinion 201. Another 2-stage gear 203 having a large gear 203a and a small gear 203b is rotatably mounted and the large gear 203a meshes with the small gear 202b. Another 2-stage gear 204 having a large gear 204a and a small gear 204b is rotatably mounted, and the large gear 204a meshes with the small gear 203b. A planetary lever 219a is rotatably mounted on a common shaft of the 2-stage gear 204 through a bearing 219b. A compression spring 220 is arranged between the small gear 204b and the bearing 219b to bring the bearing 219b and the large gear 204a into frictional contact with each other. By this frictional contact, the planetary lever 219a is caused to turn in the same direction as that of rotation of the gear 204. A 2-stage gear 205 having a large gear 205 and a small gear 205b and another 2-stage gear 208 having a large gear 208a and a small gear (not shown) formed in fixed relation on the lower surface thereof are rotatably mounted on the planetary lever 219a. A 2-stage gear 206 is arranged adjacent the gear 205, and its large and small gears 206a and 206b are rotatably mounted independently of each other. A coil spring 215 is arranged between the large and small gears 206a and 206b with one end of the spring 215 being fixed to a boss 206c of the large gear 206a so that the spring 215 functions as a one-way clutch operating in such a manner that as the large gear 206a rotates in a clockwise direction, the coil spring 215 tightens the shaft portion of the small gear 206b, causing the small gear 206b to be rotated in unison with the large gear 206a. A gear 207 meshes always with the small gear 206b and is drivingly connected to a drive sprocket 29a through a shaft 216. A pulse forming disc P1 whose entire circumference is divided into 12 equal parts is fixedly mounted on the upper surface of the gear 207 and cooperates with a pair of probes of a contact member S1. So when the drive sprocket 29a rotates one revolution, the contact member S1 produces twelve pulses. With 6 teeth on the drive sprocket 29a, as the camera of 35 mm full size advances the film by one frame for four thirds of its revolution, therefore, the number of pulses produced from the contact member S1 is sixteen for each cycle of film winding operation. Needless to say, it is also possible to use a desired number of equal parts of the pulse disc P1. If the duty drive method is employed for controlling the speed of rotation of the windup motor M2, it is preferred to increase the number of equal parts.

A 2-stage gear 209 is arranged adjacent the gear 208, has a large gear 209a and a small gear 209b and is rotatably mounted. A spool gear 210 is fixed to a spool 211 of the spool structure 22, rotatably mounted, and always meshes with the small gear 209b. The surface of the spool 211 is coated with a rubber member 211a over the entire periphery thereof to promote automatic winding of the leader of the film. Further, a cover 212 is arranged adjacent the outside of the spool 211 to be pivotal about a shaft 213. A spring 214 urges the cover 212 toward the spool 211, thus performing a function of promoting the automatic winding of the film leader on the spool 211. For note, though the cover 211, shaft 213 and spring 214 are shown in only one unit, there is another unit on the opposite side. p Another sprocket 29b is driven to rotate by the moving film only. Its rotation is transmitted to a gear 217 through a common shaft and further therefrom to another gear 218 constituting part of a detector. The ratio of the number of teeth of the gear 217 to that of the gear 218 is predetermined to be 3:4. A pulse disc P2 is fixedly mounted on the upper surface of the gear 218, constituting part of each of contact members S2 and S3 which produce one pulse for one revolution of the gear 218. The contact members S2 and S3 are so arranged that the former is closed earlier than the latter by a time for a prescribed phase of rotation of the pulse disc P2. The pulse from the contact member S2 changes the driving mode of the windup motor M2 to the duty drive, thereby the windup motor M2 is decelerated. For, as the contact member S3 produces the pulse in that time, the windup motor M2 rapidly stops when it has been braked.

The control of one cycle of operation of the windup motor M2 by the pulse produced in one revolution of the detection gear 218 results in that, in the case of the camera of 35 mm full size, the film is advanced one frame. Though it is as a matter of course, if the ratio of the numbers of teeth of the gear 217 and the detection gear 218 is altered to 3:2, or if, while the number-of-teeth ratio is left unchanged from 3:4, as the pulse signal substrate P3 is divided into two equal parts, one pulse is produced for every 180° of rotation, the amount of film fed in one cycle can be the half size. Also, if, in this case, the windup motor M2 is otherwise made to stop when two pulses have been counted, the amount of film fed can be returned to the full size. Further, if the number of counted pulses is made to change over between one and two, the feeding of film easily corresponds to either of the full size and the half size.

An explanation will be made about the transmission of the torque of the windup motor M2. When the windup motor M2 rotates in the counterclockwise direction, each part rotates in a direction of solid line arrow, and the gear 204 rotates in the clockwise direction, causing the planetary lever 219a to turn in the clockwise direction until the small gear 205b engages the large gear 206a, and, at the same time, the small gear of the gear 208 engages the large gear 209a. Therefore, the rotation of the windup motor M23 is transmitted as the pinion 201→the gear 202 (large and small gears 202a, 202b)→the gear 203 (large and small gears 203a, 203b)→the gear 204 (large and small gears 204a, 204b)→the gear 205 (large and small gears 205a, 205b)→the gear 206 (large and small gears 206a, 206b)→the gear 207→the sprocket 29a, at a speed reduction ratio for slow movement of the film, and at the same time, the gear 204 (large and small gears 204a, 204b)→the gear 208 (large gear 208a and small gear)→the gear 209 (large and small gears 209a, 209b)→the spool gear 210→the spool structure 22 at the speed reduction ratio for the slow rotation of the spool 211.

Conversely when the windup motor M2 rotates in the clockwise direction, as each part rotates in the direction of dashed line arrow, the gear 204 rotates in the counterclockwise direction, causing the planetary lever 219a to turn in the counterclockwise direction until the large gear 205a engages directly the spool gear 210. Therefore, the transmission system K2 is changed over to the small speed reduction rotio for fast rotation of the spool 211, comprising; the pinion 201→the gear 202 (large and small gears 202a, 202b)→the gear 203 (large and small gears 203a, 203b)→the gear 204 (large and small gears 204a, 204b)→the large gear 205a→the spool gear 210. For note, the drive sprocket 29a is cut off from the transmission system K2, becoming freely rotatable.

As will be seen from the foregoing, that part of the transmission system K2 which goes from the wind-up motor M2 to the spool structure 22 operates with selection of two speed reduction ratios depending on the direction of rotation of the windup motor M2. In more detail, when it is counterclockwise, the speed reduction ratio for the slow speed results. Conversely when clockwise, the other reduction ratio for the high speed results. In either of the directions of rotation, the spool structure 22 always rotates in the counterclockwise direction.

It should be pointed out that the choice of the counterclockwise rotation of the windup motor M2 is exercised only when the camera is set to an automatic film loading mode. Because the high speed reduction of the windup transmission system K2 operates, the sprocket 29a is driven to rotate, pulling the film out of the cartridge, while the fed portion of the film is taken up on the spool structure 22. In the subsequent or one-frame-at-a-time or continuous run mode, by the clockwise rotation of the windup motor M2, the windup transmission system K2 is switched to the low speed reduction, driving the spool structure 22 only to rotate at a high speed. Of course, the wind mode may otherwise be operated by the counterclockwise rotation of the windup motor M2. Even if so, no slack loop of film between the drive sprocket 29a and the spool structure 22 is formed, because the peripheral speed of the spool structure 22 is previously adjusted to be faster than that of the drive sprocket 29a. In other words, the drive sprocket 29a functions as a drive source for the film only when the film is not pulled by the spool structure 22. For the other time, it acts merely as an idler.

Figure 5:
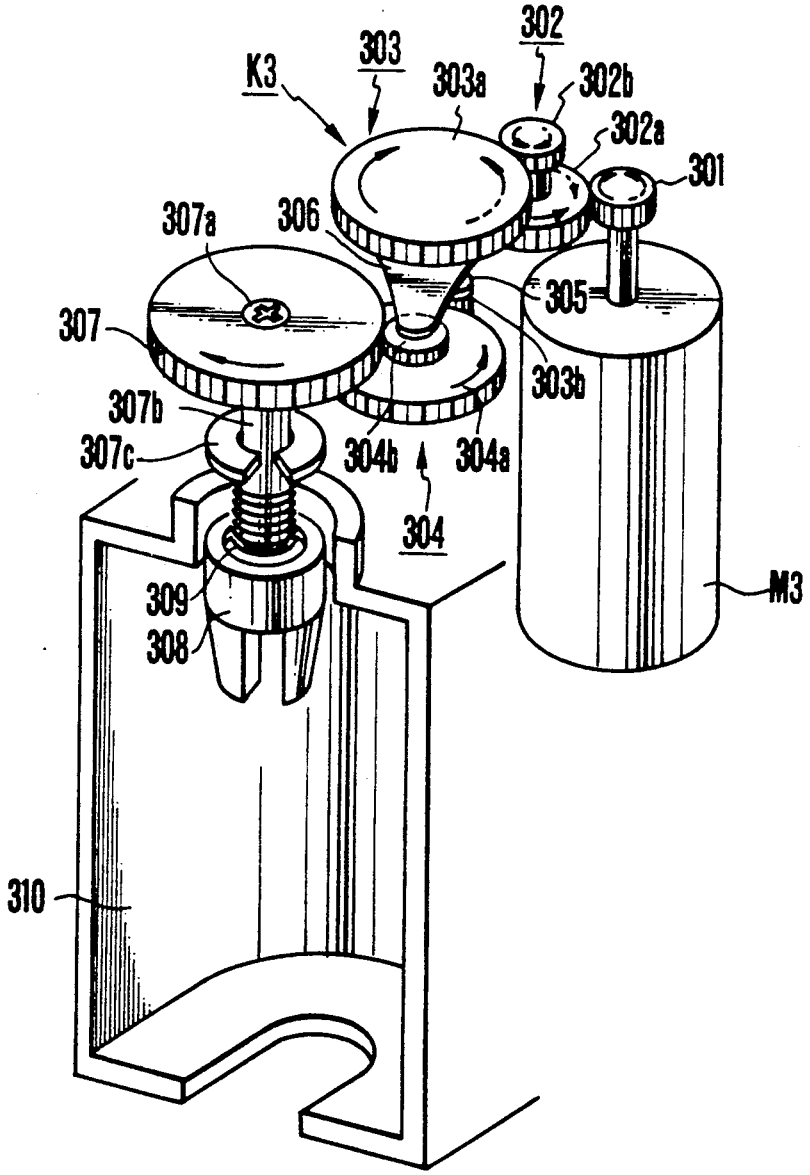
FIG. 5 is an oblique view of a rewind transmission system.

In FIG. 5, there is shown the detail of the rewind motor M3 and the rewind transmission system K3.

A pinion 301 is fixed to the output shaft of the rewind motor M3. A 2-stage gear 302 having a large gear 302a and a small gear 302b is rotatably mounted, the large gear 302b meshing with the pinion 301. Another 2-stage gear 303 having a large gear 303a and a small gear 303b is rotatably mounted, the large gear 303a meshing with the small gear 302b. A planetary lever 306 is pivotally mounted on a common shaft of the gear 303. A compression spring 305 is arranged between the small gear 303b and the planetary lever 306 to bring the planetary lever 306 into frictional contact with the large gear 303a. By this frictional contact the planetary lever 306 is caused to follow up the direction of rotation of the gear 303. Another 2-stage gear 304 having a large gear 304a and a small gear 304b is rotatably mounted on the free end of the planetary lever 306. A gear 307 is mounted on one end of a shaft 307b by a fastener screw 307a, the opposite end of which carries a fork 308. The fork 308 extends into the interior of a cartridge chamber 310, and is arranged to engage with the hub of a supply spool in the cartridge (not shown). A coil spring 309 is arranged between a washer 307c on the shaft 307b and the shoulder of a fork 308 to make it easy to insert the film cartridge into the chamber 310, as the fork, 308 can temporarily retract.

When the rewind motor M3 rotates in the clockwise direction, the gear 303 rotates in the clockwise direction, causing the planetary lever 306 to turn in the clockwise direction until the small gear 304b comes to mesh with the gear 307. Therefore, the driving torque is transmitted; the pinion 301→the gear 302 (large gear 302a, small gear 302b)→the gear 303 (large and small gears 303a, 303b)→the gear 304 (large and small gears 304a, 304b)→the gear 307+the fork 308. Conversely when the rewind motor M3 rotates in the counterclockwise direction, the planetary lever 306 turns in the counterclockwise direction, taking the small gear 304b out of mesh with the gear 307. Thus, the driving torque is not transmitted to the fork 308. therefore, by rendering the rewind motor M3 to turn some angles in the counterclockwise direction, it is made possible not to add the rewind transmission system K3 and the rewind motor M3 to the winding-up load when the windup motor M2 perform the film winding operation. Thus, the load with which the winding-up of the film accompanies can be minimized.

Figure 6:
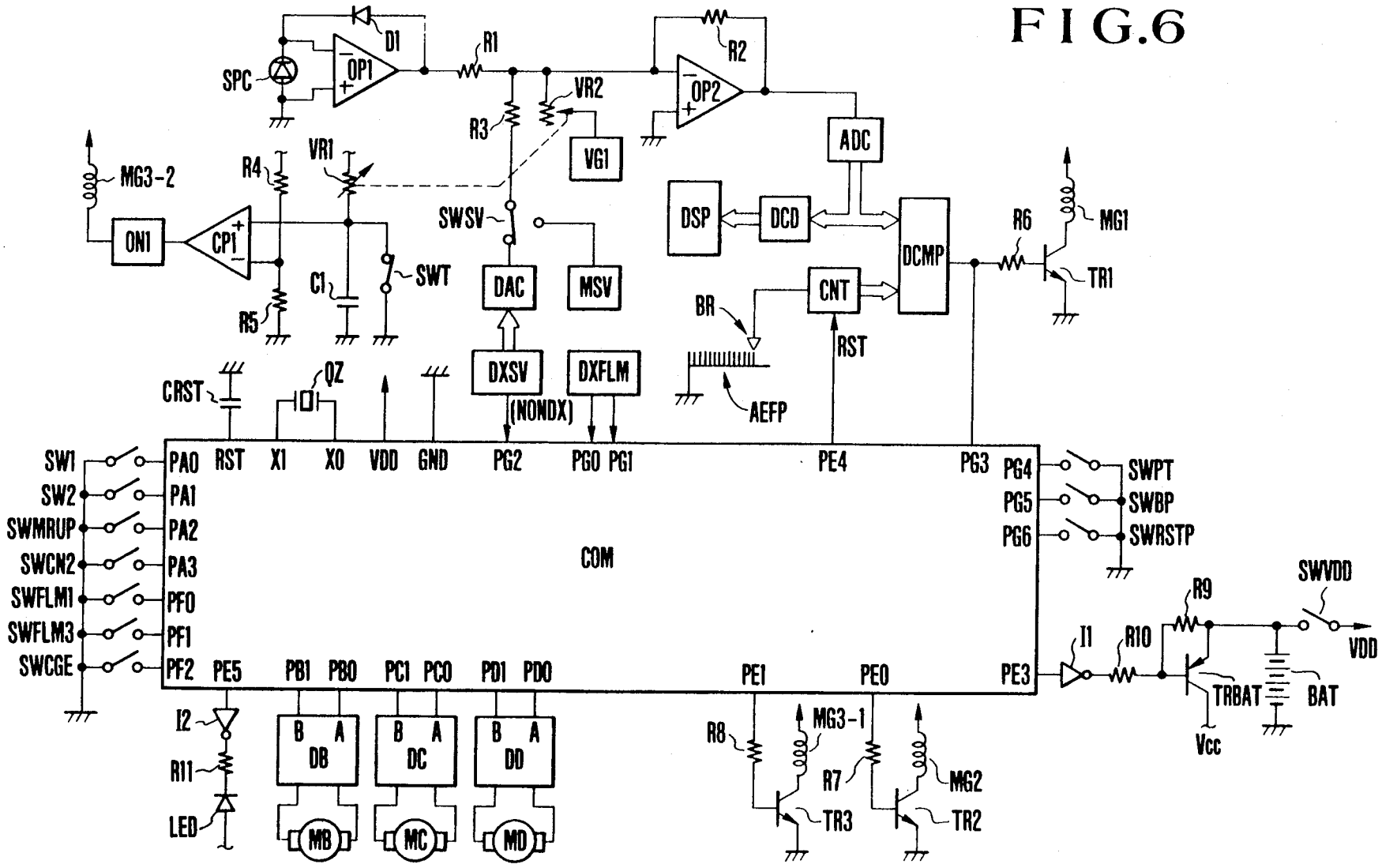
FIG. 6 is a block diagram showing a microcomputer arranged to control the operation of the camera including the film rewinding device arranged as a first embodiment of this invention.

In accordance with this invention, the first embodiment is arranged such that the period of time after the output of the film detection means ceases to vary and before the motor is brought to a stop is variable from one length of time over to another by means of the output of selection means. The details of the microcomputer which is arranged to control this function of the camera are as described below with reference to FIG. 6:

In FIG. 6, a light receiving (photosensitive) element SPC is arranged to receive a light flux coming from an object to be photographed. A light measuring circuit which includes an operational amplifier OP1 and a compressing diode D1 is arranged to obtain logarithmically compressed information BV corresponding to the luminance of the object. Meanwhile, film sensitivity information SV is obtained either from ISO film sensitivity value detecting means DXSV or from manual film sensitivity value setting means MSV. Shutter time setting information TV is obtained from a variable resistor VR2 which is arranged to operate in response to a shutter dial. An operational amplifier OP2 is arranged to obtain an aperture value AV in the form of a voltage by computation performed on the information or data BV, SV and TV. A display device DSP is arranged within a view finder to display this aperture value AB. Then, a diaphragm, control magnet MG1 controls the aperture of a diaphragm according to the value AV. The illustration of FIG. 1 includes a DA (digital-to-analog) converter DAC which is arranged to DA convert the data from the ISO film sensitivity detecting means; a selection switch SWSV is arranged to make selection between the manual film sensitivity value setting means MSV and the ISO film sensitivity value detecting means DXSV; a constant voltage source VG1; the operational amplifier OP2 which is arranged to compute an aperture value in a manner BV+SV−TV from the data BV, SV and TV as mentioned above; an AD (analog-to-digital) converter ADC; a decoder driver DCD which is provided for the display device; a counter CNT; a comb-shaped electrode AEFP; and a brush BR for the electrode AEFP. The instant the aperture of the lens is stopped down, the brush travels to produce a signal. This signal is supplied to the counter CNT. The counter CNT thus counts the signal to give a counted value as an actually stopped down aperture value. A digital comparator DCMP is arranged to have the output of the counter CNT supplied to one of the input terminals thereof. Meanwhile, the above-stated computed aperture data which is converted into a digital value is supplied from the AD converter ADC to the other input terminal of the digital comparator DCMP. When the two inputs come to coincide with each other, the output level of the comparator DCMP becomes a low level (hereinafter referred to as a level 0). The low level signal comes via a resistor R6 to turn off a transistor TR1. With the transistor TR1 turned off, a current flowing to the aperture control magnet MG1 is cut off to bring the stopping down operation on a diaphragm to a stop. The lens aperture is thus actually controlled in accordance with the computed aperture value.

A first clamp magnet MG2 is arranged to initiate a known mechanical sequence of processes of the camera when the magnet is driven. With the magnet MG2 driven, the above-stated aperture control is first accomplished. A magnet MG3-1 is arranged to release or unlock a leading shutter curtain from a locked state. With a current supplied to the magnet MG3-1, the leading shutter curtain is allowed to travel. A count switch SWT is arranged to be normally closed and to open when the leading shutter curtain travels. A variable resistor VR1 and a capacitor C1 jointly form an integration circuit which becomes operative when the count switch SWT opens. The variable resistor VR1 is mechanically coupled with the above-stated variable resistor VR2 and is thus arranged to be set at a resistance value corresponding to a preset shutter time value. A comparator CP1 has the integrated voltage output of the integration circuit supplied to one of the input terminals thereof. Meanwhile, a voltage Vcc obtained by dividing a power supply voltage with resistors R4 and R5 is arranged to be supplied to the other input terminal of the comparator CP1. Accordingly, the output of the comparator CP1 is under the control of a time constant circuit having the time constant thereof determined by the variable resistor VR1. The output level of the comparator CP1 becomes a high level (hereinafter referred to as a level 1) after the lapse of the shutter time. Then a one-shot circuit ON1 causes the output of the comparator CP1 to be at a level 0 for a predetermined period of time. By this, a current is supplied to a magnet MG3-2 which is provided for a trailing shutter curtain. The magnet MG3-2 then allowed the trailing shutter curtain to travel.

The camera is provided with a total of three motors including one for film winding, another for film rewinding and the last one for a charging action. A reference symbol MB denotes the film winding motor; a symbol DB a driving circuit for the motor MB; a symbol MC the film rewinding motor; a symbol DC a driving circuit for the motor Mc; a symbol MD the charge motor; and a symbol DD a driving circuit for the motor MD.

A film frame number reading device DXFLM is arranged to read a frame number code of the film which is provided in a DX code. A warning display device LED is arranged to give a warning in the event of a film having no DX code.

A microcomputer COM is arranged to control the operation of the camera described. The microcomputer COM is provided with a power supply battery BAT and a power supply transistor TRBAT. The static circuit operation described in the foregoing is performed only while the power supply transistor TRBAT is on. The microcomputer COM receives the power supply when a power supply switch $SWV_{DD}$ is turned on.

The microcomputer COM includes terminals X0 and X1 which are connected to a crystal oscillator QZ arranged to supply fundamental clock pulses; a reset terminal RST; a power supply terminal $V_{DD}$; and a ground terminal GND. The input ports of the microcomputer COM include an input port PA0 which is connected to a first stroke switch SW1 arranged to be turned on by the first stroke of operation on a shutter release button; an input port PA1 which is connected to a second stroke switch SW2 arranged to be turned on by the second stroke of operation on the shutter release button; an input port PA2 which is connected to a mirror switch SWMRUP arranged to be in an ON state while a mirror is in a down position thereof; an input port PA3 connected to a trailing shutter curtain switch SWCN2 which is arranged to turn off when the trailing shutter curtain travels and to turn on when the trailing shutter curtain is charged; an input port PF0 connected to a first film switch SWFLM1 which is arranged to turn on and off according to the winding of film; an input port PF1 connected to a third film switch SWFLM3 which is arranged to turn on in response to the sprocket upon completion of winding one frame portion of film; an input port PF2 connected to a charge switch SWCGE which is arranged to turn on upon completion of a charging action on the shutter, an automatic aperture control device and a mirror; input ports PG0 and PG1 connected to the above-stated frame number reading device DXFLM; an input port PG2 connected to an ISO film sensitivity value detector DXSV; and an input port PG3 connected to the above-stated digital comparator DCMP. The microcomputer COM is provided further with an input port PG4 connected to a film cartridge presence/absence switch SWPT; a port PG5 connected to a camera back lid opening/closing switch SWBP which is arranged to be in an OFF state when the back lid of the camera is closed; and a port PG6 connected to a leader part selection switch SWRSTP which is arranged to permit selection between complete rewinding of film into the film cartridge and film rewinding leaving a leader part of the film outside of the cartridge and to turn on when the former rewinding is selected and off when the latter is selected. This switch SWRST is either arranged outside of the camera to permit the photographer to freely make the selection or arranged with a wiring pad disposed within the camera or on a printed circuit board to permit a service station or the like to make the selection according to the desire of the photographer.

The output ports of the microcomputer COM include an output port PE0 connected to a first clamp magnet MG2 via a resistor R7 and a transistor TR2; an output port PE1 connected to the leading shutter curtain magnet MG3-1 via a resistor R8 and a transistor TR3; an output port PE3 connected to the power supply transistor TRBAT via an inverter I1 and a resistor R10; an output port PE4 connected to the reset input terminal RST of a counter CNT; and an output port PES connected to the DX code warning display device LED via an inverter 12 and a resistor R11. Further, output ports PB0, PB1, PC0, PC1, PD0 and PD1 are connected respectively to driving circuits DB, DC and DD which are provided for motors MB, MC and MD.

Figure 7:
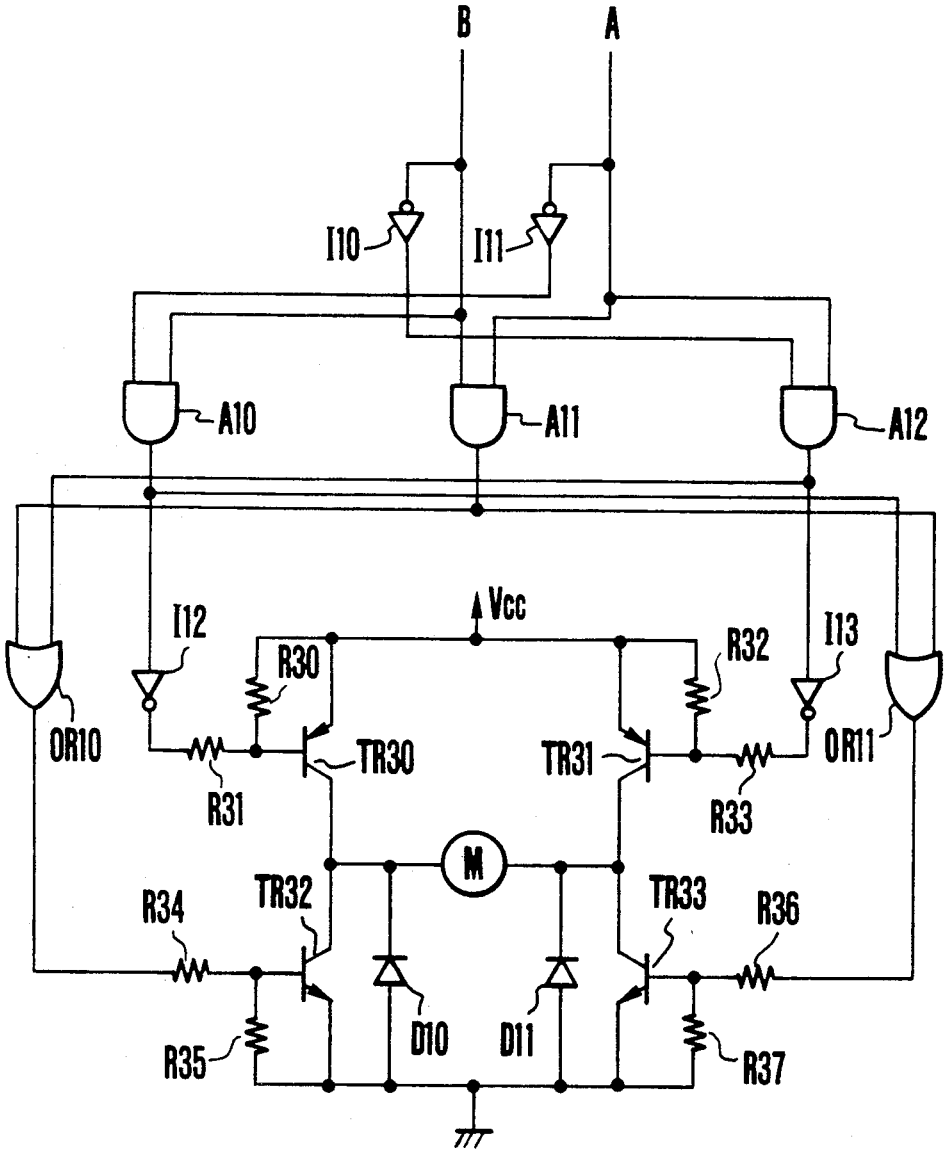
FIG. 7 is a circuit diagram showing a driving circuit provided for a motor shown in FIG. 6.
Figure 8:
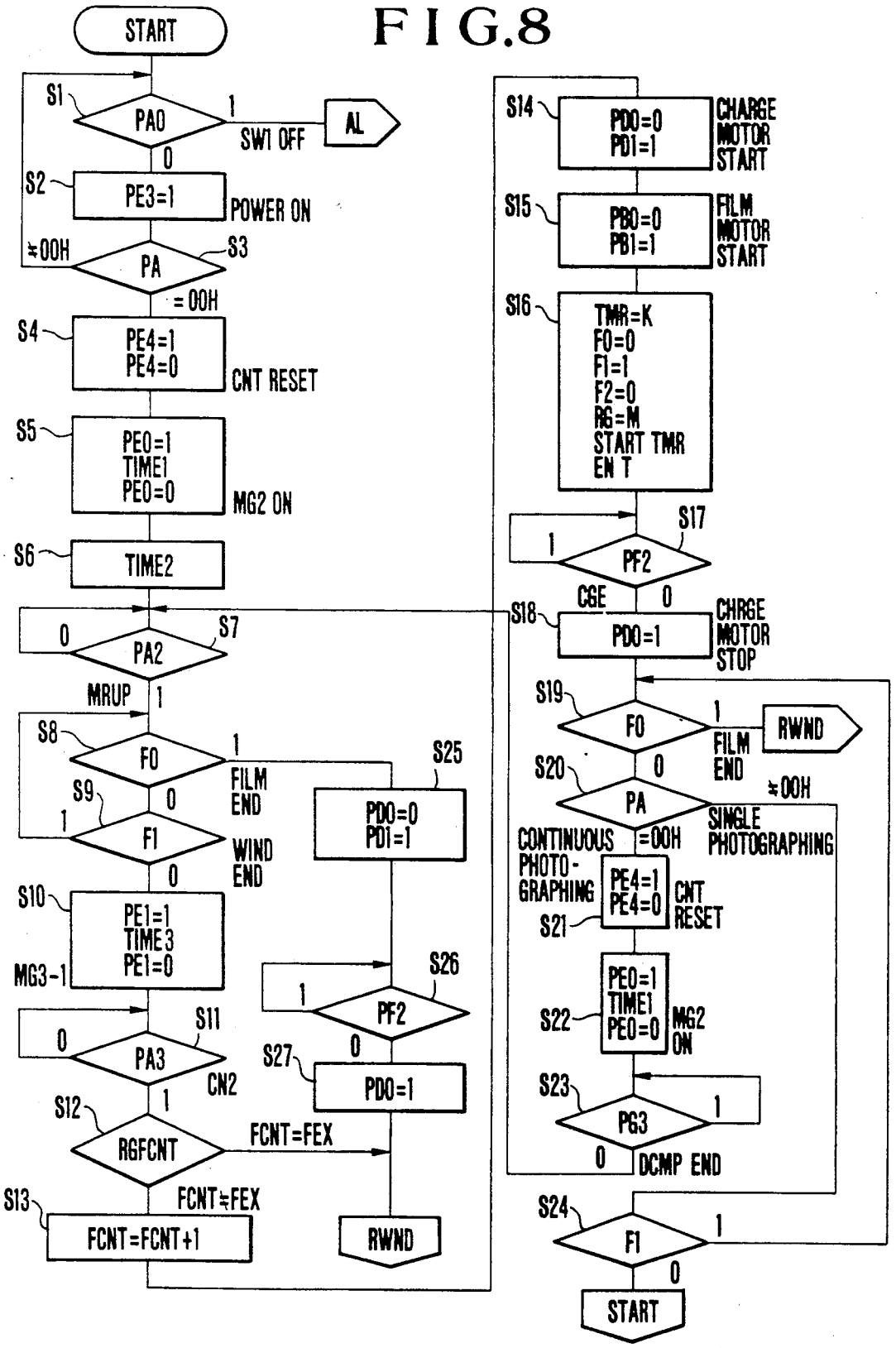
FIGS. 8, 9, 10 and 11 are flow charts showing the operation of the microcomputer of FIG. 6.

The driving circuits DB DC and DD for the motors MB, MC and MD are arranged in the same manner. FIG. 7 shows the details of each of these driving circuits. The illustration includes a motor M; inputs A and B; inverters I10 and I11; AND gates A10, A11 and A12; OR gates OR10 and OR11; transistors TR30, TR31, TR32 and TR33; resistors R30, R31, R32, R33, R34, R35 and F36; and diodes D10 and D11. The inputs A and B are information or data consisting of two bits. In case of A=1 and B=0, the output of the AND gate A12 becomes a level "1" and that of the OR gate OR10 also becomes a level "1". Then, the transistors TR32 turns on. Further, the output of the inverter 113 becomes a level "0" to cause the transistor TR31 to turn on. This in turn causes a current to flow to the motor M from the power supply Vcc through the transistor TR31, the motor M and the transistor TR32. The motor then rotates. If A=0 and B=1, the output of the AND gate A10 becomes a level "1" ; that of the OR gate OR11 also becomes a level "1"; and that of the inverter I12 becomes a level "0". This causes the transistors TR30 and TR33 to turn on. As a result, the motor M comes to rotate in the direction reverse to the direction in which it rotates in the above-stated case. In the event of A=1 and B=1, the output of the AND gate A11 becomes a level "1". The outputs of the OR gates OR10 and OR11 then become a level "1". The transistors TR32 and TR33 turn on. Therefore, when the driving circuit is set into this input mode while the motor M is rotating, the power supply from the power supply Vcc is cut off irrespective of the rotation of the motor caused by the diodes D10 and D11 and the transistors TR32 and TR33 in whichever direction the motor may be rotating. Then, while the motor further rotates by the force of inertia, a short-circuit brake is applied to the motor.

Further, in the event of A=0 and B=0, the outputs of all the AND gates A10 and A12 become a level "0". All the transistors TR30, TR31, TR32 and TR33 turn off to bring the motor into an open state.

FIGS. 8 to 11 are flow charts showing the operation of the microcomputer COM. The microcomputer COM becomes operative when it receives a power supply voltage VDD with the power supply switch SWVDD turned on. It then receives the fundamental clock pulses from the crystal oscillator QZ connected to the terminals X0 and X1. At the same time, a power-on reset action is performed by the capacitor CRST connected to the reset terminal RST. A program counter which is included in the microcomputer COM is initially set at an address "0". A program beings from a step START. Each flat is set at 0 and each output port is also set at "0". First, a main routine shown in FIG. 8 will be explained.

Step S1: An input is received through the input poart PA0. If the first stroke switch SW1 of the shutter release button is in an ON state, the operation of the microcomputer COM proceeds to a step S2. If the switch SW1 is in an OFF state, the operation comes to an automatic loading routine AL (without photo-taking) which will be described later.

Step S2: The output level of the port PE3 becomes a level "1". This causes the power supply transistor TRBAT to turn on via the inverter I1 and the resistor R10. The voltage Vcc is then supplied to the power supply terminals of all the circuits including the operational amplifier, the AD converter, etc.

Step S3: Inputs (hereinafter referred to as PA input) are received via the input ports PA0 to PA3. Then, if the photographer pushes the release button further to the extent of the second stroke thereof with all the applicable parts having been charged, there obtains a condition of PA0=PA1=PA3="0" (the level "0"). Therefore, the PA inputs a value of 00H in the hexadecimal notation. Then, the operation proceeds to a step S4. Further, if any one of the switches connected to the PA ports is in an OFF state, the value of the PA input does not become 00H and the operation comes back to the ste S1.

Step S4: The output of the port PE4 is set at a level "1" and is then set at a level "0" to produce one pulse from the port PE4. The counter CNT is reset by the pulse output.

Step S5: The output of the output port PE0 is set at "1". Then, the output of the port PE0 is set at "0" after the lapse of the predetermined time TIME1. This step is for initiating a known mechanical sequence of release actions including an aperture stopping-down action and a mirror unlifting action by allowing a current to flow to the first clamping magnet MG2 for the predetermined period of time TIME1. To save electrical energy, the current supply to the first clamping magnet MG2 is cut off after the lapse of the predetermined period of time TIME1 from the end of the sequence of release actions. This period of time TIME1 is set at a value a little longer than a minimum length of time required for the power supply to the first clamping magnet MG2.

With the first clamping magnet MG2 driven in this manner, the known mechanical sequence of release actions of the camera is carried out to begin with aperture control. The lens aperture control is performed in the same manner as described in the foregoing.

Step S6: A predetermined wait time TIME2 is obtained by a timer.

Step S7: An input is received via the input port PA2 indicating the state of the mirror. A mirror uplifting action is expected to be performed after the lapse of some period of time because the first clamp magnet MG2 has been actuated. The mirror uplifting action is performed at about the same time as the aperture stopping down action by the operation of the first clamp magnet MG2. While the mirror uplifting action is accomplished approximately in a predetermined period of time, the length of time required for stopping-down the aperture varies with the aperture value. However, a release time which takes place after the pushing operation on the shutter release button and before the shutter is opened must be arranged to be unvarying, because: The photographer is controlling the timing for pushing the release button predictively taking the actual shutter opening time into consideration. If the above-stated release time lag changes, a shutter chance tends to be missed. Such a camera is not reliable. This problem is effectively solved by arranging the wait time TIME2 of the step S6 to be somewhat longer than a maximum time required for stopping down the aperture. With the wait time arranged in this manner, the program of operation shifts to the next step S7 always after completion of the aperture stopping down action. The mirror uplifting time is normally shorter than the maximum aperture stopping-down time. The flow of operation branching out from the step S7 never comes back to the step S7. The operation proceeds to a step S8.

Step S8: A check is made for the state of the flag F0. A state of the flag F0=1 indicates the end of the film.

Step S9: A check is made for the flag F1. A state of the flag F1=0 indicates completion of film winding. At both the steps S8 and S9, the flags F0=F1 are at a level "0" as a result of the power-on reset process. The flow of operation proceeds to a step S10.

Step S10: The output of the output port PE1 is set at "1" to supply a current to the leading shutter curtain magnet MG3-1. After the lapse of a predetermined period of time TIME3, the output is set at 0 to cut off the current supply. With the magnet MG3-1 thus energized, the leading shutter curtain travels. The count switch SWT is opened by this. After the lapse of a shutter time selected by a shutter dial, the trailing shutter curtain magnet MG3-2 is energized via the one-shot circuit ON1 for a predetermined period of time. The trailing shutter curtain travels. The control over the focal plane shutter then comes to an end.

Step S11: The input terminal PA3 receives an input indicative of the state of the trailing shutter curtain. If the input becomes a level "1" indicating completion of the travel of the trailing shutter curtain, the flow of operation proceeds to a step S12. However, if the travel of the trailing curtain is not completed, the operation remains in the step S11 until completion of the travel.

Step S12: A check is made to find whether the value FCNT of the photographed frame number register RGFCNT is equal to the photographable number of frame portions of film supplied via the input ports PG0 and PG1. If the photographable frame number FEX and the photographed frame number are found to be equal to each other, the operation comes to a film rewinding step RWND. If not, the operation proceeds to a step S13. In the case of a 36-exposure film, fir example, the flow of operation comes to the step RWND upon completion of 36th phototaking exposure and the film is then automatically rewound.

Step S13: An increment of the content of the photographed frame number register RGFCNT is effected by one. As will be further described later on, the photographed frame number register RGFCNT is initially set at "1" during the process of the automatic loading routine AL.

Step S14: The output levels of the output terminals PD0 and PD1 are set at PD0=0 and PD1=1, respectively. By this, the driving circuit DD is actuated to cause the charge motor MD to rotate. With the motor M thus rotated, the shutter, the mirror and the automatic aperture control device etc. are charged.

Step S15: The output levels of the output terminals PB0 and PB1 are set at PB0=0 and PB1=1. The driving circuit DC is actuated by this. The film winding motor MB is then rotated clockwise. The film is wound up. The film winding action is performed in parallel with the charging action on the shutter, the mirror, the automatic aperture control device, etc. However, this arrangement may be changed to differentiate the current supply start times for these actions from each other for the purpose of preventing overlapping of rush currents during the initial period of power supply to these motors MD and MB. For example, there may be provided a period of time for waiting until stabilization of the current flowing to the charge motor MD.

Step S16: A constant K is set at a timer interrupting timer TMR. The value of the constant K is determined by a film winding speed, the number of the equal divisions of the pulse disc P1 (see FIG. 4) of the first film switch SWFLM1 and the time intervals of the instruction giving cycle o the microcomputer COM. The timer interrupting timer TMR is started for making timer interruption possible (EN T). A constant M is supplied to the internal register RG. Further flags are set at F0=F2=0 and F1=1. The flat F2 is arranged to show the ON and OFF states of the first film switch SWFLM1. After the start of the timer TMR, the timer TMR repeats a decrement action independently of the main program routine. Thus, interruption takes place at every predetermined period of time determined by the constant K. Then, the flow of operation jumps from a step at which the program is presently being performed to a separately arranged time interrupting address. The time interrupt operation is as described below with reference to FIG. 9:

Timer Interrupt Operation

Step S101: The decrement action of the timer TRM and the interruption are inhibited.

Step S102: An input from the first film switch SWFLM1 to the input port PF0 is received. The operation proceeds to a step S103 if the input (of the port) PF0 is at a level "0" indicating an ON state of the switch or comes to a step S109 if it is at a level "1" indicating an OFF state of the switch.

Step S103: The flag F2 is checked. With the flag F2 set at "0" at the step S16, the operation proceeds to a step S104.

Step S104: The content of the internal register RG is decreased by "1".

Step S105: A check is made for RG=0. With the program carried on up to this point of operation, the register RG is in a state of RG=M−1, wherein M represents a constant. If the constant M is large enough, the content thereof does not become "0" and the operation proceeds to a step S106.

Step S106: The third film switch SWFLM3 which is connected to the sprocket to detect completion of film winding by one frame portion thereof supplies a signal to the input port PF1. With the end of the one frame film winding detected in this step S106, the operation comes to a step S113. If not, it proceeds to a step S107.

Step S107: Again the constant K is set at the timer register. The timer TMR begins to operate to enable interruption.

Step S108: The original program in process is resumed. The timer interrupt operation is provided as it is difficult to make a discrimination between signals coming from the two film switches SWFLM1 and SWFLM3 at intervals of a given period of time during the process of the original or main program. Since each instruction is carried out at a very high speed during the process of the program, there arises no problem with film winding information received at every given time interval determined by the constant K.

Assuming that the, first film switch SWFLM1 is turned off by a timer interrupt process, the operation comes from the step S102 to a step S109.

Step S109: A check is made for the flag F2=1. Since the flag F2 has been set at F2=0 in the step S16, the operation proceeds to a step S110.

Step S110: The flag F2 is set at "1". this means that the first film switch SWFLM1 is turned off thus resulting in an input state of PF0=1.

Step S111: Again the constant M is set at the internal register RG. The operation comes to the step S106 to perform the above-stated routine. However, since the flag F2 has been set at F2=1 at the step S110, the ensuing timer interrupt operation comes from the step S109 to the step S104 or comes from the step S103 to a step S112.

Step S112: The flag is set at "0" for the same purpose as in the step S110. Then, the operation comes to the step S111. If one film frame portion winding comes to an end with a current supplied to the film winding motor MB, the third film switch SWFLM3 turns on to bring about an input state of PF1=0. The operation then shifts from the step S106 to a step S113.

Step S113: The port PB0 is set at PB0=1. Since another port PB1 has been set at PB1=1 in the step S15, the power supply to the film winding motor MB is cut off and the brake is applied.

Step S114: The flag F1 is set at F1=0 to indicate completion of film winding. The operation then comes back to the original program at the step S108. Since the step S107 has been skipped in this instance, the timer interruption never again takes place thereafter.

Let us now assume that photographing has been completed on the 24th frame portion of a 24-exposure film which is not provided with any film frame number indicating code. In this instance, the film does not move any further in response to a film winding attempt made by the winding motor MB. Therefore, the first film switch SWFLM1 ceases to make any change-over between its ON and OFF states. Accordingly, the flag F2 remains at "0" or "1". At the step S104, the content of the internal register RG is decreased or subtracted one by one until there obtains a state of RG=0 with the timer interrupt process repeated. The operation then comes to a step S115 from the Step S105.

Step S115: The ports PB0 and PB1 are set at PB0=0 and PB1=0 respectively to open both terminals of the winding motor MB.

Step S116: The flag F0 is set at F0=1 to indicate the end of the film. The timer interrupt operation described is constantly carried out between the step S16 of the main routine and the step S9 for a next photographing operation, so that the film winding action of the camera can be accurately controlled.

The main program routine is further performed in the following manner.

Step S17: The microcomputer COM is arranged to receive a signal from the charge switch SWCGE indicating completion of a charging action on the shutter, the automatic aperture control device and the mirror. A routine loop of steps is formed beginning with this step S17 for waiting for completion of the charging action or for turning on of the charge switch SWCGE. If the charging action has not been completed, the operation comes back to the step S17. Upon completion of the charging action, the operation proceeds to a step S18. In the meantime, the timer interrupt operation is repeated between the steps S17 and S18.

Step S18: The output of the port PD0 is set at "1". The brake is applied to the charge motor MD by this.

Step S19: The flag F0 is checked for the end of film. If the film has not been used up, the operation proceeds to a step S20.

Step S20: This step is similar to the step S3. The second stroke switch SW2 remains in an ON state in the case of a continuous photographing. In that case, the input of the input ports PA becomes "00H" in the hexadecimal notation. The operation proceeds to a step S21.

Step S21: This step is similar to the step S4. The counter CNT is reset.

Step S22: The step is similar to the step S5. A current is supplied to the first clamp magnet MG2 to allow a next sequence of shutter releasing processes to begin. At that time, film winding may be allowed to be continuously performed. In other words, if it is desired to have photographing continuously performed on a maximum number of frames within a given period of time, the sequence of shutter releasing processes is repeatedly started without waiting for the end of each film winding process.

Step S23: The port PG3 receives a signal indicative of an aperture stopped down state. As mentioned in the foregoing, the aperture stopping action is performed with the first clamp magnet MG2 actuated. The output of the digital comparator DCMP becomes a level "0" upon completion of aperture stopping down control. Therefore, a discrimination can be made between completion and non-completion of the stopping down action from a signal coming via the input port PG3. Upon completion of the aperture stopping down action, the operation comes to the step S7. A noteworthy feature of the embodiment is as follows: For the first round of photographing, the sequence of processes is arranged at the step S6 to make the shutter release time lag unvarying. However, this routine step is skipped for each of ensuing rounds of photographing operation. As mentioned in the foregoing, the length of time required for the mirror uplifting action is shorter than the maximum length of time required for stopping down the aperture. Therefore, the ensuing release time lag can be made shorter than the first time lag. Although the release time lag varies with the controlled aperture value, it is meaningless to make the release time lag unvarying for the second and ensuing rounds of the photographing operation in the event of continuous photographing. In other words, the release time lag depends on the charging time and film winding time during the second and subsequent rounds of photographing and the shutter intervals cannot be determined by the photographer.

With the uplifted state of the mirror having been confirmed in the step S7, a check is made for completion or incompletion of film winding in the step S9. During the period up to this point of time, the timer interruption is applied many times. Upon detection of completion of film winding, the operation proceeds to a next step of shutter control. The routine steps for the continuous photographing operation are performed in this manner. Further, the embodiment is designed to complete film winding before the end of aperture control if the battery is not too old. Therefore, the frame feeding speed can be increased to a maximum extent as the waiting time of the step S9 is eliminated.

Next, the operation in the case of single-frame or non-continuous photographing is carried out as follows: In this instance, the photographer is not pushing the shutter release button to its second stroke position after photographing on one frame. Therefore, the input of the ports PA does not become "00H". The operation, therefore, comes from the step S20 to a step S24.

Step S24: The loop of steps from the step S24 to the step S19 is repeated until the flag F1 is confirmed to be in a state of F1=0 thus indicating an end of film winding through the timer interrupt operation. The flow of operation comes back to the step START after completion of film winding.

Figure 10:
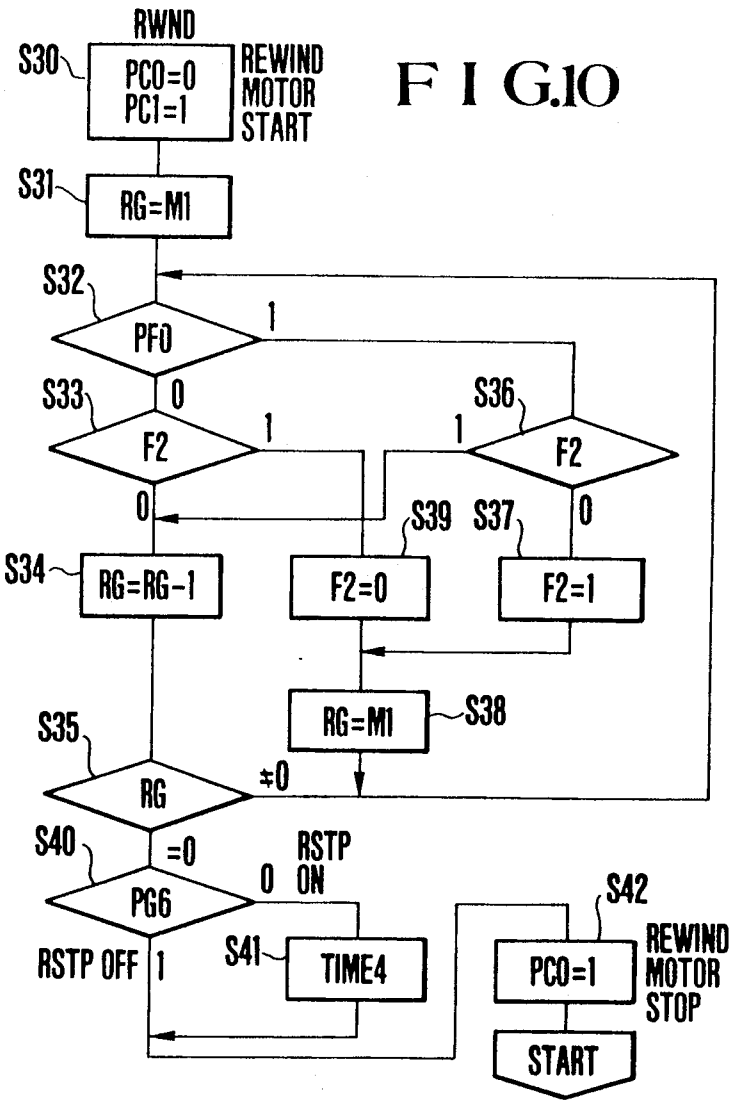

In the event that the film comes to the end thereof before completion of the film winding action, the operation is performed in the following manner: The film never comes to its end halfway during the film winding action with the DX code provided on the film cartridge as the number of photographed frames FCNT and the number of photographable frames FEX are compared with each other in the step S12. However, in cases where the film is not provided with the DX code or where a portion of film is cut before it is used for photographing, this accident takes place. In that event, the flag F0 becomes "1" during the process of the timer interrupt operation. Therefore, the flow of operation comes from the step S19 to the rewinding Step RWND. The rewinding operation is as shown in FIG. 10.

Film Rewinding Operation: Referring to FIG. 10, the flow of operation branches out to a step S30 in cases where a state of FCNT=FEX obtains in the step S12 and where a state of the flag F0=1 obtains at the step S19 respectively.

Step S30: The output ports PC0 and PC1 are set at states of PC0=0 and PC1=1. By this, the driving circuit DC is actuated to cause the rewinding motor MC to rotate.

Step S31: A constant M1 is set at the internal register RG.

Step S32: The input port PF0 is arranged to receive a signal from the switch SWFLM1. During film winding, the switch SWFLM1 produces the signal representing ON and OFF of contact between a brush and a comb-like pattern connected to the sprocket. This signal is received via the input port PF0 at the step S32.

Steps S32 to S39: The operation is performed in a manner similar to the program of detecting the movement of film which has been described at the steps S102, S103, S104, S105, S109, S110, S111 and S112 of the timer interrupt operation. In the program of steps S32 to S39, it is detected that the driving sprocket 29a ceases to rotate any further upon completion of film rewinding. The operation proceeds to a step S40 after completion of film rewinding.

Step S40: An input is received via the input port PG6. The operation proceeds to a step S41 if the leader part selection switch SWRSTP which makes selection between a complete film rewinding action winding the film completely into the cartridge and a film rewinding action leaving a leader part of the film outside of the cartridge is in an ON state or comes to a step S42 if this switch SWRSTP is in an OFF state.

Step S41: A predetermined length of waiting time TIME4 is created by means of a timer. In other words, the rewinding motor MC is allowed to continue to rotate after the sprocket 29a comes to a stop, so that the film is completely taken up into the film cartridge in this step.

Step S42: The port PC0 is set at a state of PC0=1. Since the port PC1 has already been set at the state of PC1=1 in the step S30, the power supply to the rewinding motor is cut off and the brake is applied to the rewinding motor MC.

In case that the leader part selection switch SWRSTP is found to be in an OFF state at the step S40, the rotation of the rewinding motor comes to a stop immediately after the stop of rotation of the sprocket 29a. In this case, the film rewinding action comes to an end leaving the leader part of the film on the outside of the film cartridge. With the film rewinding action thus having been completed, the operation comes back to the START step of the main program routine.

Let us next assume that, during the process of continuous photographing, the charging action on the shutter, the mirror and the automatic aperture control device is quickly completed before the end of film winding and that the film winding comes to the end after the first clamp magnet MG2 has been energized at the step S22 for a next round of photographing operation. This condition never arises when the information on the photographable number of frames FEX is received with the DX code provided on the film cartridge. However, in the event of occurrence of the above-stated condition, the film winding comes to a stop in an incompleted state while the aperture is stopped down and the mirror is uplifted as a mechanical release action has been initiated by the first clamp magnet MG2. Since the film cannot be wound up any further, the third film switch SWFLM3 remains in its OFF state. If the film is rewound under this condition, the photographer might perform an erroneous operation by misconceiving the shutter to be open. Further, intense rays of light incident on the lens under such a condition might cause a photographic fog on the film. To avoid such troubles, the film is rewound preferably after bringing the mirror down to its lowered position.

During the period of waiting for completion of film winding at the steps S8 and S9 after confirmation of the uplifted state of the mirror at the step S7, the flag F0 is set at F0=1 at the step S116 of the timer interrupt operation when the end of the film is detected. Then, the flow of operation branches out from the step S8 to the step S25.

Step S25: The ports PD0 and PD1 are set at PD0=0 and PD1=1 to cause the charge motor MD to rotate.

Step S26: A check is made to see if the charging action has been completed. If so, the operation proceed to a step S27.

Step S27: The port PD0 is set at PD0=1 to apply the brake to the charge motor MD. Since the mirror is charged under that condition, the mirror comes back to its original position. Following this, the operation jumps to the step S30 RWND, at which the film rewinding action is performed.

Figure 11:
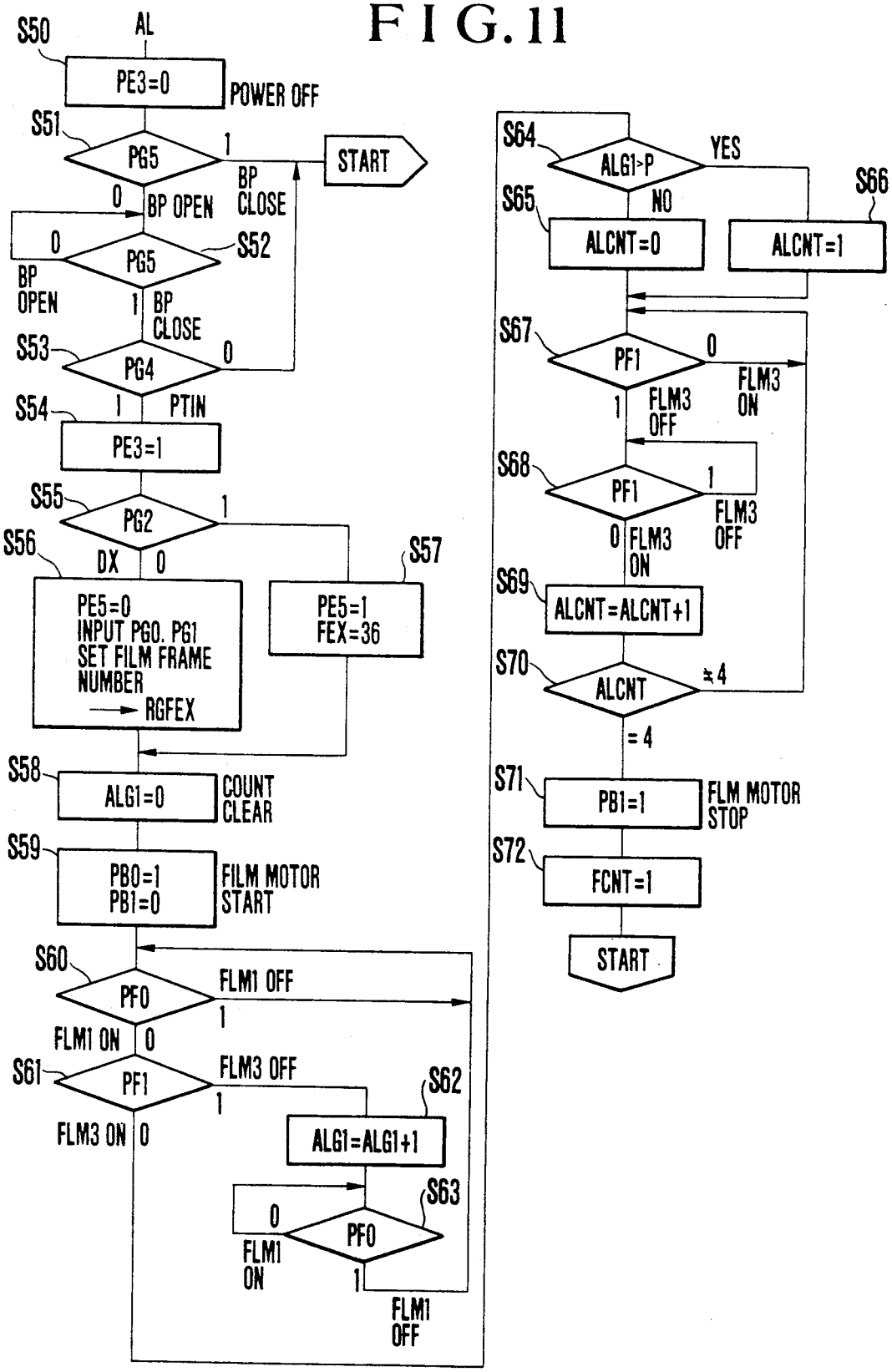

In the last place, let us consider a case where the first stroke switch SW1 of the shutter release button is in an OFF state at the step START of operation. In that case, the operation jumps to an address AL for automatic blank feeding of film. The automatic film blank feeding operation is as shown in FIG. 11.

Automatic Blank Feeding Operation

Step S50: The port PE3 is set at PE3=0. By this the power supply to all the circuit elements is cut off with the exception of the microcomputer COM.

Step S51: A signal from the back lid opening/closing switch SWBP is received via the input terminal PG5. The operation comes back to the step START if the back lid is closed and proceeds to a step S52 if it is open.

Step S52: The signal from the back lid opening/closing switch SWBP is again received via the input terminal PG5. The operation stays at this step S52 until the back lid comes to close. When it closes, the operation proceeds to a step S53. In other words, the camera remains inoperative as long as the back lid thereof is open. Recently, shutters particularly focal plane shutters are made of thin metal blades for a high speed operation. If such a shutter is operated with the back lid in an open state, it might hurt the finger of the photographer. Therefore, the shutter is inhibited from operating when the back lid is not closed. In testing the shutter operation, it can be operated while the back lid is left open with the switch SW1 turned on before opening the back lid.

Step S53: The input port PG4 receives an input from the cartridge presence/absence detection switch SWPT. The operation comes back to the step START when the cartridge accommodating chamber has no cartridge therein and proceeds to a step S54 when it has a cartridge placed therein.

Step S54: The port PE3 is set at PE3=1. The power supply voltage Vcc is supplied to each applicable circuit element.

Step S55: The port PG2 receives an input from the ISO sensitivity detecting means DXSV. In case that the film cartridge is not provided with any DX code, the ISO sensitivity detecting means DXSV produces a signal NONDX at a level "1". Further, in the event of a film cartridge provided with some wrong and inappropriate DX code, the detecting means DXSV also produces the signal NONDX. The operation comes to a step S57 in that event and proceeds to a step S56 if this signal NONDX is not produced.

Step S56: The output port PE5 is set at "0". The DX code warning display device LED is not caused to light up by the inverter I2 and the resistor R11 (no warning is given). The code representing the number of frame portions of film is read by means of the input ports PG0 and PG1. A DX film number code consists of three bits. In this case, however, only two bits are arranged to be received for a film product normally in use. With the number of frame portions of film thus detected from the code, the detected value is stored at the FEX register.

Step S57: A signal is produced at "1" from the output port PE5 to give a warning by lighting up the LED. In accordance with this warning, if the film in use is not provided with any DX code, the photographer operated the switch SWSV to manually set a film sensitivity value by operating a necessary setting member (MSV). If the film in use is provided with a DX code, the film cartridge is again inserted into the camera to preclude any possibility of misreading of the code. Then, if the program comes to the step S57, the film frame number register FEX is set at "36". Therefore, in the event of such a film, no further photographing is allowed after the 36th frame.

Step S58: An internal count register ALG1 which is arranged to count the number of repeating times of the ON and OFF action of the first film switch SWFLM1 for automatic loading is set in its initial position "0".

Step S59: The ports PB0 and PB1 are set at PB)=1 and PB1=0 to cause the film winding motor MB to rotate in the direction reverse to the normal feeding direction. The motor MB thus rotates the sprocket 29a to cause the film to come into the spool.

Step S60: The input port PF0 receives an input from the first film switch SWFLM1. The operation waits until the first film switch SWFLM1 turns on the then proceeds to a step S61.

Step S61: The port PF1 receives an input from the third film switch SWFLM3. If the third film switch SWFLM3 is in an OFF state, the operation proceeds to a step S62.

Step S62: The content of the internal count register ALG1 is increased by one.

Step S63: The port PF0 again receives an input from the first film switch SWFLM1. The first film switch SWFLM1 has been in an ON state since the step S60. Therefore, in this step, the flow of operation waits until the switch SWFLM1 turns off and then comes back to the step S60.

The routine of steps S60 to S63 is arranged such that: In loading the camera with the film, the camera is arranged to feed one frame portion of the film when the switch SWFLM3 is on despite of the unsettled ON state of the switch SWFLM3. As a result, with a predetermined number of frame portions of film blank fed by an automatic loading operation, it might become impossible to feed the camera with a total of 36 frame portions of film, for example, in the case of a 36-exposure film product. To solve this problem, it is necessary to count the number of times for which the switch SWFLM1 repeats its ON and OFF actions after the motor beings to rotate and before the switch SWFLM3 comes to turn on for the first time. The number of times of the ON and OFF actions of the switch SWFLM1 has been counted at the register ALG1 when the operation comes from the step S61 to a step S64.

Step S64: The content of the internal count register ALG1 is compared with a constant P. The constant P is set at a value not exceeding a number of pulses obtained from the pulse disc P1 via the contact member S1 for one frame portion of film. Therefore, in case that the content of the internal count register ALG1 exceeds the constant P, it indicates that the portion of film taken up into the spool is long. If the former is smaller that the constant P, it indicates a shorter portion of film is taken up into the spool. The operation comes to a step S66 in the case of ALG1>P and proceeds to a step S65 in the event of ALG1<P.

Step S65: An automatic loading frame number counting internal register ALCNT (hereinafter referred to as the frame number register) is set at ALCNT=0.

Step S66: The frame number register is set at ALCNT=1.

Step S67: The port PF1 receives an input from the third film switch SWFLM3. The third film switch SWFLM3 has been in an ON state since the step S61, the operation waits until the switch SWFLM3 turns off. With the switch SWFLM3 turned off, the operation proceeds to a step S68.

Step S68: The port PF1 receives an input from the third film switch SWFLM3, which has been in an OFF state since the step S67. The operation waits until the third film switch SWFLM3 turns on. With the switch turned on, the operation proceeds to a step S69. Accordingly, one frame portion of film has been fed when the operation comes to the step S69.

Step S69: The content of the frame number register ALCNT is increased by one.

Step S70: The frame number register ALCNT is checked for a state of ALCNT=4. This is because the number of frame portions of film to be fed in a blank state (without photographing) is four in general. Since, up to that time, the content of the frame number register is only "1" or "2", the operation comes back to the step S67 to repeat the above-stated routine until there obtains a state of ALCNT=4. When this state obtains, the operation proceeds to a step S71. The steps S64 to S70 are arranged such: Three frame portions of film are blank fed after the start of automatic loading and before the third film switch SWFLM3 comes to turn on for the first time when the length of the film taken up on the spool is long while four frame portions of film are blank fed if the length of film taken up on the spool during that period is short. By virtue of this arrangement, the length of film to be taken up on the spool by automatic loading does not much vary without fixedly setting the phase of the third film switch SWFLM3.

Step S71: The port PB1 is set at PB1=1. The other port PB0 has been set at PB0=1 at the step S59. Therefore, at the step S71 a current supply to the film winding motor MB is cut off and a brake is applied to the motor.

Step S72: The photographed number of frames FCNT is set at FCNT=1. With this, the film blank feeding action comes to an end. The operation then comes back to the step START of the main program routine.

The film rewinding device of the camera arranged as described above according to this invention as a first embodiment thereof is capable of selecting either the film rewinding mode of taking up the whole film completely into the film cartridge or another mode of leaving the leader part of the film outside of the cartridge. In addition to that, the embodiment is advantageous also in terms of space and cost. Besides, the embodiment ensures that the film after photographing will never be accidently exposed to light.

Figure 12:
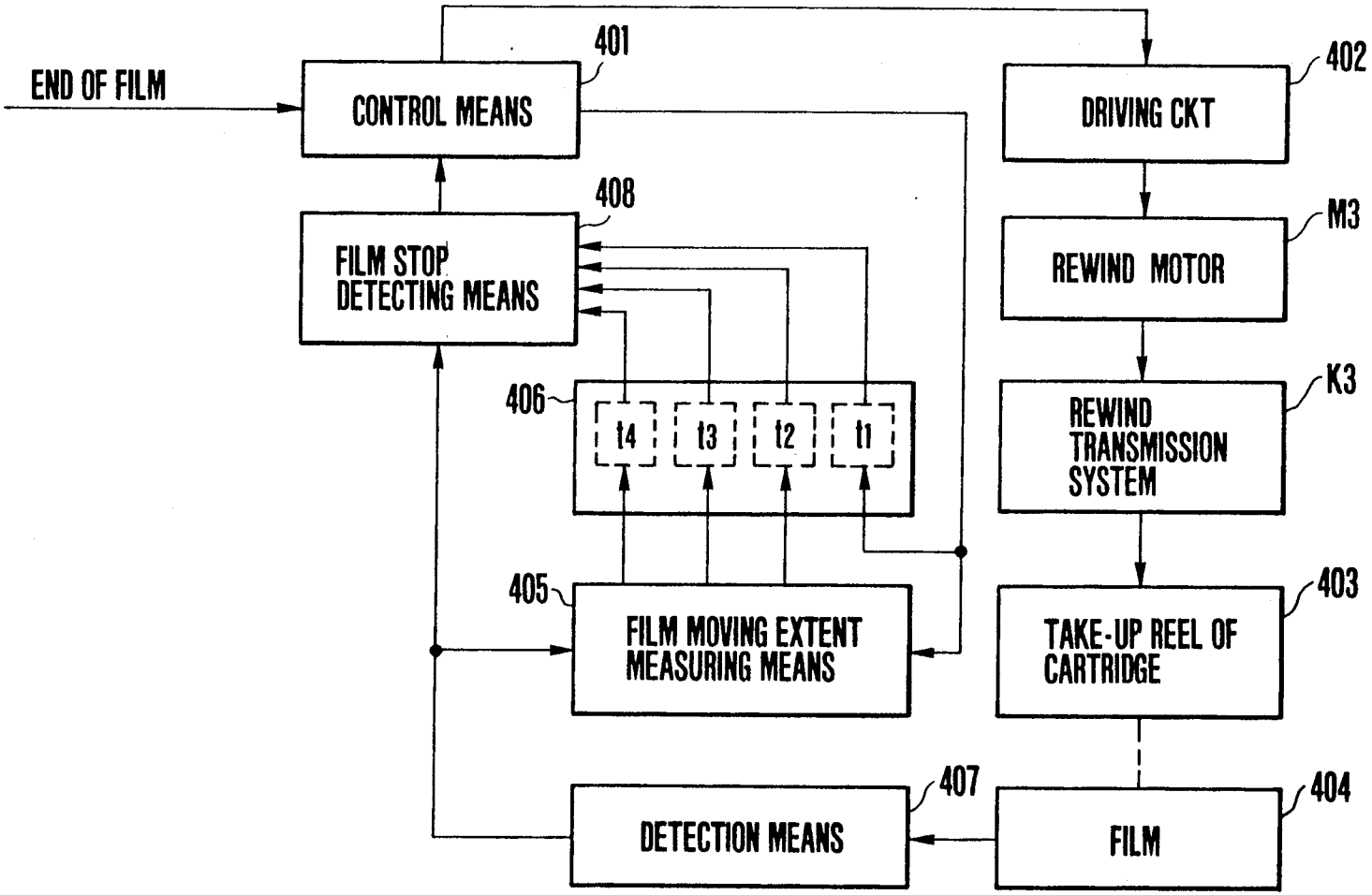
FIG. 12 is a block diagram showing a second embodiment of this invention.

A second embodiment of this invention is arranged as described below:

The mechanical arrangement which as shown in FIGS. 1 to 5 and the motor driving circuit shown in FIG. 7 are also usable as they are for the second embodiment. FIG. 12 shows in outline the arrangement of the second embodiment. Upon detection of the end of film, control means 401 renders a driving circuit 402 operative to cause a rewind motor M3 to rotate in one direction (for example, forward). The motor M3 rotates the take-up reel 403 of the cartridge via a rewind transmission system K3. A rewinding action on the film 404 begins. At the same time, a film moving extent value stored at a film moving extent measuring means 405 is reset at "0" and the timer tie of timer means 406 is initially set at a maximum length of timer time t1 by the control means 401. The timer means 406 is arranged to have its timer time selectable from among four different time values t1, t2, t3 and t4, which are in a relation of t1>t2>t3>t4. The longest tier time t1 is sufficiently long for allowing a loosely wound portion of the fill 404 on the take-up reel 403 of the cartridge to tighten. Meanwhile, the shortest timer time t4 is set at such a value as to ensure that the leader part of the film 404 is not pulled into the cartridge after its disengagement from the sprocket which is provided with detection means 407.

The detection means 407 is arranged on the sprocket to detect the movement of the film 404 which takes place during film winding and rewinding actions. The detection means 407 produces, for example, one pulse every time the sprocket turns round to a predetermined rotation angle. The detection means 407 further detects a winding state obtained immediately before completion of winding and also detects completion of film winding.

In cases where the film 404 is not in a state of being tightly coiled or wound within the film cartridge in the initial stage of film rewinding, the film 404 does not have until it comes to be tightly coiled. During the tightening period of film 404, therefore, the output state of the detection means 407 remains unchanged. The output comes to change only after completion of the tightening process. Film stop detecting means 408 is arranged to detect a stopped state of film by detecting that the output state of the detection means 407 does not change even after the lapse of a timer time given from the timer means 406. The longest timer time t1 is given to the film stop detecting means 408. Since the inner time t1 is longer than a length of time necessary for the coil tightening process of the film 404, the means 408 detects within the timer time t1 the pulse output of the detection means 407 produced after completion of the coil tightening process of the film 404 and does not determine it to be indicative of a stopped state of the film 404. This enables the control means 401 to allow the driving action of the rewind motor M3 to continue.

The first pulse output of the detection means 407 indicates commencement of the movement of the film 404 after completion of the coil tightening process of the film 404. Therefore, upon receipt of the first pulse, the film moving extent measuring means 405 shifts the timer time of the timer means 406 to the timer time t2. Further, the timer time is arranged to come back to 0 every time one pulse is produced from the detection means 407 for renewal of the time counting action of the timer means 406.

When a number of pulses from the detection means 407 corresponding to an accelerating process of the film movement are counted, the film moving extent measuring means 405 shifts the timer time of the timer means 406 to the timer time t3.

Then, when a number of pulses from the detection means 407 corresponding to arrival of the stabilized speed of movement of the film 404 are counted, the film moving extent measuring means 405 shifts the timer time of the timer means to the timer time t4. The timer time t4 expires before the leader part of the film 404 is pulled into the cartridge after disengagement from the sprocket. The film stop detecting means 408 determines on the basis of the lapse of the timer time t4 that the film movement has come to a stop. Then, the control means 401 brings the operation of the rewind motor M3 to a stop. Accordingly, the film rewinding action comes to an end with the leader part of the film 404 left outside of the film cartridge.

In case that the film 404 comes to stop moving, due to some malfunction during the coil tightening process of the film 404, during the acceleration process after commencement of movement, or before coming to a stabilized moving speed of the film from the accelerating state, the accidental film stoppage is detected by the film stop detecting means 408 immediately after the lapse of the timer time t1, t2, t3 or t4. In response to this detection, the control means 401 brings the rewind motor M3 to a stop. Therefore, any trouble relative to film rewinding is detectable within a minimum period of time. The overload on the rewind motor M3 which results from the above-stated trouble thus can be minimized.

The control means 401, the film moving extent measuring means 405, the timer means 406 and the film stop detecting means 408 may be arranged within a single microcomputer. The four timer time values may be changed to three or five or more than five values. The detection means 407 which is arranged to detect the movement of the film 404 from the rotation of the sprocket may be changed to detect it directly in an optical mechanical or electrical manner. The detection means 407 also may be arranged to change its output state every time one frame portion of film is moved. The rewind motor does not have to be separately provided but may be arranged not solely to serve as the rewind motor but also to serve either as a film windup motor or as a shutter charging motor.

Figure 13:
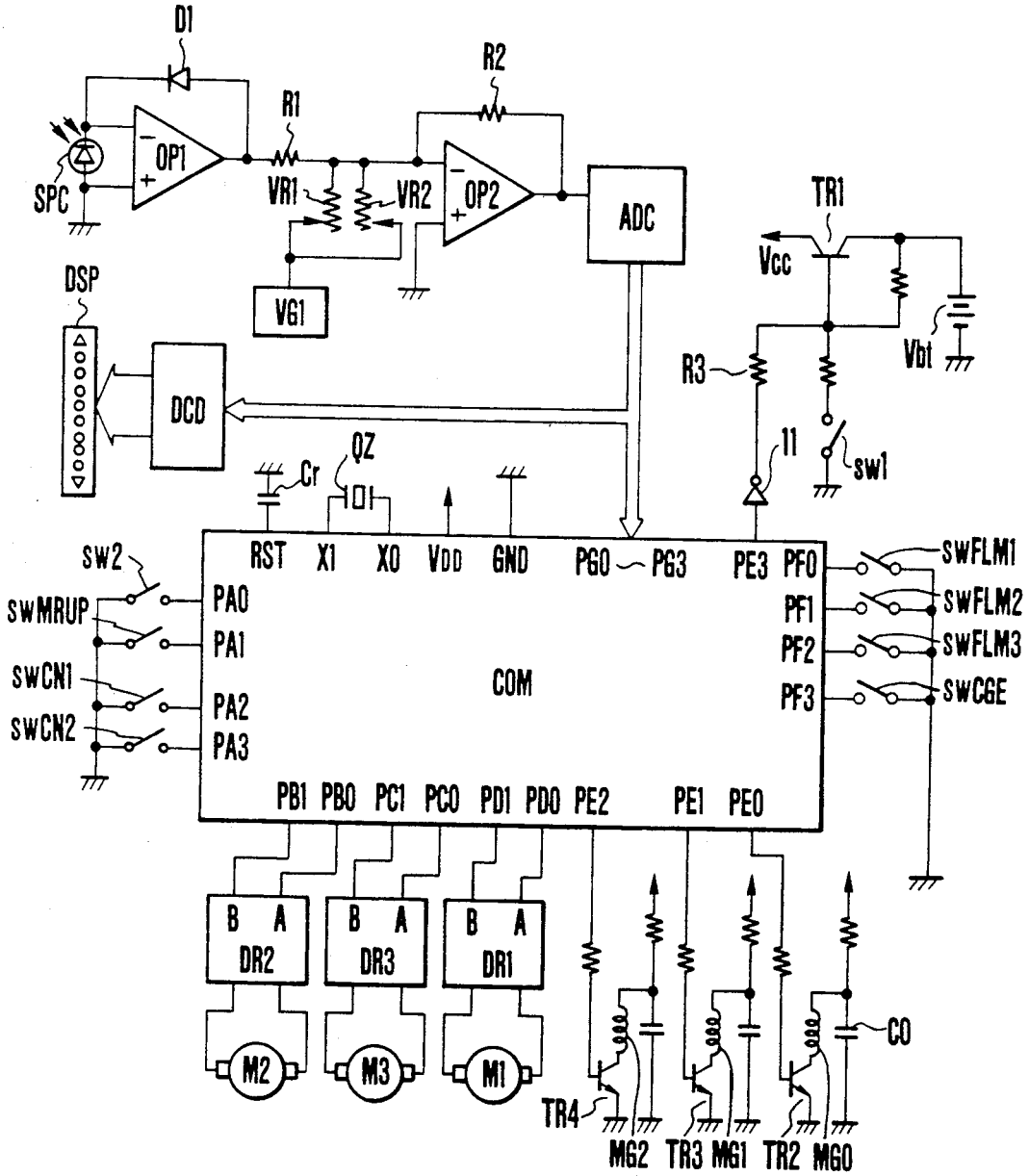
FIG. 13 is a circuit diagram showing a microcomputer and related circuits.

FIG. 13 shows by way of example an electrical circuit arrangement where a microcomputer COM is arranged to serve as the control means 401, etc. In FIG. 13 and ensuing flow charts, the parts similar to those described in the foregoing as parts of the first embodiment are indicated by the same reference numerals and symbols.

A silicon photo cell SPC is positioned to receive light from an object to be photographed and is connected between two inputs of a operational amplifier OP1 of high input impedance with a compression diode D1 connected in the feedback loop thereof. The operational amplifier OP1 produces an output signal Bv representing the logarithm of the brightness of the object through a resistor R1. Variable resistors VR1 and VR2 are connected to a constant voltage generator BG1 and produce film sensitivity information Sv and aperture value information Av. Another operational amplifier OP2 having a resistor R2 in the feedback loop thereof computes an exposure value i.e. shutter time information Tv based on the formula: $Tv=(Bv+Sv-Av)$. The shutter time information Rv is converted to a 4-bit digital value by an A/D converter ADC and then displayed by display device DSP within the finder through a decoder driver DCD, and applied to input ports PG0 to PG3 of the microcomputer COM. For note, 4-bit binary coded values [0001] to [1000] correspond to 1/1000 sec. to $\frac{1}{8}$ sec. and those [0000] and [1001] or more represent warning signals in the display.

When a release button is pushed down to a first stroke, a first stroke switch sw1 is closed, thereby a transistor TR1 is turned on to supply electrical power as a voltage Vcc from a battery Vbt to the various portions of the circuitry. Though not given the Vcc-labelled arrow in the drawing, the operational amplifiers and the A/D converter, for example, are of course supplied with the electrical power. Even after the first stroke switch sw1 is opened, the power supply is sustained so long as an output port PE3 of the microcomputer COM produces a signal of low level which is applied through an inverter I1 and a resistor R3 to the base of the transistor TR1.

The microcomputer COM has a terminal RST connected to a capacitor Cr at one pole with the opposite grounded, terminals X0 and X1 between which is connected a quartz oscillator QZ, another terminal VDD connected to the voltage source Vcc, and another terminal GBD grounded.

Its input ports PA0 to PA3 are respectively connected to a second stroke switch sw2 arranged to turn on when the release button is pushed down to a second stroke, a mirror-up switch swMRUP arranged upon mirrorup to turn off and upon mirror-down to turn on, a leading curtain switch swCN1 arranged to turn off or on when the leading curtain of the shutter has run down or charged respectively, and a trailing curtain switch swCN2 arranged to turn off or on when the trailing curtain of the shutter has run down or charged respectively.

Another input ports PF0 to PF3 are respectively connected to a first film switch swFLM1 comprising the pulse disc P1 and the contact member S1 (FIG. 4), a second film switch swFLM2 comprising the pulse disc P2 and the contact member S2 (FIG. 4), a third film switch swFLM3 comprising the pulse disc P2 and the contact member S3 (FIG. 4), and a charge switch swCGE comprising the signal disc on the cam gear 109 (FIG. 3) and the contact member S0 and arranged to turn on when the charging operation is completed.

Its output ports PE0 to PE2 are connected to the bases of transistors TR2 to TR4 respectively controlling the current supply to a permanent magnet-equipped solenoid MG0 of the first latch for beginning a mechanical release operation, a leading curtain release solenoid MG1 and a trailing curtain release solenoid MG2.

Another output ports PB0 and PB1 are connected to a drive circuit DR2 for the windup motor M2. Another output ports PC0 and PC1 are connected to a drive circuit DR3 for the rewind motor M3. Another output ports PD0 and PD1 are connected to a drive circuit DR1 for the charge motor M1. FIG. 7 illustrates the details of each of the drive circuits DR1 to DR3.

The operation of the microcomputer COM is next explained in detail by reference to the flow charts of FIGS. 14A, 14B, 14C and 15.

Step S201: By the supply of the battery voltage Vcc in response to closure of the first stroke switch sw1, the microcomputer COM is started to operate. A train of clock pulses from the quartz oscillator QZ are received, and at the same time, a power-on reset is executed by the capacitor Cr. A built-in program counter is initialized to No. 0 address, causing program execution to begin with the block labeled "START". Here, all the flags are assumed to have "0" and all the output ports also to have "0".

Step S202: Inputs from the ports PA0 to PA3 (hereinafter referred to as "PA" inputs, and this holds for the other ports) are received. If all the portions of the camera are in their charged positions, then when the photographer further pushes down the release button to the second stroke, $PA0=PA1=PA2=PA3=0$ result. Thus, the PA inputs have a value of [00H] in the hexadecimal number system.

Step S203: If the PA inputs are [00H], jump to step S205. If not, advance to step S204.

Step S204: Now assuming that the PA inputs are not [00H], then the PE3 output is charged to "0". Since, at th e time of the power-on reset, all the output ports are "0", this command is meaningless. But because the program has a loop to step S201, it is at this time that it has meaning. (Latch release of the battery voltage Vcc).

Step S205: When the PA inputs are [00H], or when the photographer pushes the release button to the second stroke, procedure to exposure mode is executed. The PE3 output becomes "1", sustaining the ON state of the transistor TR1 to latch the voltage Vcc.

Step S206: The APEX value Tv of shutter time in the form of a 4-bit digital value from the A/D converter ADC is introduced. Since the numbers of bits is four, the possible decimal numbers are "0" through "15".

Step S207: Since the PG inputs of step S206 are stored in an accumulator A, this value is transferred to an internal register RG1.

Step S208: The PE0 output is changed to "1", causing the transistor TR2 turn on so that the capacitor C0 which has so far been charged to almost equal a voltage to the battery voltage Vcc is suddenly discharged to the first latch control solenoid MG0. Thereby, a mechanical release is actuated.

Step S209: The flow is waited for a certain time by a timer. A program for this purpose is, for example, to put a certain value into the accumulator A, and then subtract one by one from that value until $A=0$. The time necessary to do this may be used as the waiting time. The program procedure is not shown because the flow chart would become very complicated. For note, TIME2 to TIME6 have similar programs.

Step S210: The PE0 output is then changed to "0", thereby the current supply to the first latch control solenoid MG0 is cut off. TIME1 may be determined to be slightly longer than the minimum time for which the first latch control solenoid MG0 is energized. After that, the mechanical sequence of operation goes on so that the diaphragm is closed down to the presetting, and the mirror is moved upward.

Step S211: The PA1 input representing the movement of the mirror is taken up. In a certain time from the release of the mirror from the latching connection by MG0, the mirror should reach the terminal end of movement.

Step S212: A routine for waiting the mirror until it reaches the non-viewing position. When this position is reached, step S213 is executed. This routine is provided for ascertaining that the mirror is moved away completely from the light path to the exposure aperture, before the shutter is opened.

Step S213: The flag F0 is examined. F0=1 represents the film end.

Step S214: The flag F1 is examined. F1=0 represents the termination of each cycle of fill winding operation.

Step S215: Whether or not the value of the internal register RG1 is "0" is examined. As has been described above, when the computed shutter time is shorter than 1/1000 sec., the PG inputs take "0000", or RG1=1.

Step S216: If RF1=0, it is forced to RG1, or the shutter time is fixed to 1/1000 sec.

Step S217: Whether or not RG>8, or the shutter time is longer than $\frac{1}{8}$ sec. is examined.

Step S218: If RG1>8, it is forced to RG1=8, or the shutter time is fixed to $\frac{1}{8}$ sec.

Step S219: The accumulator A is incremented by "1". Routines in steps S219 to S222 are to convert the value of the internal register RG1 representing the shutter time to elongate as multiplied by "2" in sequence.

Step S220: "1" is subtracted from the value of the internal register RG1, and then put again into it.

Step S221: Whether or not RG1=0 is examined. If it is "0", jump to step S223. If not, advance to step S222.

Step S222: The content of the accumulator A is shifted to the left, or doubled. On assumption that the accumulator A has 8 bits, then when, for example, RG1=8, the content of the accumulator A is shifted 7 times. Since the initial content of the accumulator A was [00000001], it, therefore, becomes [10000000].

Step S223: The content of the accumulator A is transferred to the internal register RG1. Thus, the shutter time is elongated in multiplied-by-2 serial fashion.

Step S224: The PE1 output is changed to "1", causing the leading curtain control solenoid MG1 to be supplied with current. The leading curtain starts running.

Step S225: A waiting time is formed by a constant time timer.

Step S226: The content of the internal register RG1 is reduced by "1".

Step S227: The steps S225 to S227 are repeated until the content of the internal register RG1 becomes "0". In this step, an actual time of the shutter time is counted.

Step S228: The PE2 output is changed to "1", causing the trailing curtain control solenoid MG2 to be supplied with current. The trailing curtain runs down, terminating the operation of the focal plane shutter.

Step S229: A time necessary for the trailing curtain to travel across the film gate is formed by a constant time timer.

Step S230: Reset to PE1=PE2=0. So the leading and trailing curtain control solenoids MG1 and MG2 are deenergized.

Step S231: An input from the trailing curtain sensor switch swCN2 is taken up.

Step S232: A routine for waiting the trailing curtain switch swCN2 to open or waiting up for the completion of the running down of the trailing curtain. When it has run down, advance to step S233.

Step S233: PD0=1, PD1=1 render the drive circuit DR1 operative. The charge motor M1 starts to rotate. Thereby, the shutter, mirror and automatic diaphragm are charged.

Step S234: Wait for a time from the start of current supply to the charge motor M1 to start energization of the windup motor M2, until the current flowing through the winding of the charge motor M1 becomes stable. Thereby, the rush currents in the initial stages of operation of the motors M1 and M2 are prevented from superimposing one upon another.

Step S235: PB0=0, PB1=1 render the drive circuit DR2 operative. The windup motor M2 starts to rotate. Thereby the film is wound up.

Step S236: Set a constant K in a timer TMR for timer interruption. K is taken at a value depending on the winding-up speed of the film, the number of equally divided parts of the pulse disc P1 (FIG. 4) of the first film switch swFLM1, and the period of instruction cycle of the microcomputer COM.

Step S237: Start the timer TMR for timer interrupt. Enable the timer interrupt (EN t). Input a constant M into the internal register RG2. Set the flags F0=F2=F3=0, F1=1. The flag F2 represents the ON or OFF state of the first film switch swFLM1, and the flag F3 represents the ON or OFFR state of the second film switch swFLM2. The timer TMR since started is decremented repeatedly independently of the main program routine. For every prescribed time (dependent on the constant K), interruption is effected with jump from the executed program to a specific timer interruption address. Here, the timer interrupt operation is explained by reference to FIG. 15.

Timer Interrupt Operation

Step S301: Prohibit decrement and interruption of timer TMR.

Step S302: Input PF0 from the first film switch swFLM1.

Step S303: If PF0=0, advance to step S304. If PF0=1, jump to step S314.

Step S304: Because PB0 remains the same as that set in step S235, the current supply to the wind-up motor continues.

Step S305: Test flag F2. Because F2 has been set in step S237, advance to step S306.

Step S306: Decrease the content of the internal register RG2 by "1".

Step S307: Test RG2=0. Since, in the up-to-present program, RG2=M−1, for, as M is somewhat large a value, it does not become "0", advance to step S308.

Step S308: Input PF1 from the second film switch swFLM2.

Step S309: Test PF1=0. If the film is not being advanced just before the terminal end of length of one frame yet, PF1=1. So, advance to step S310.

Step S310: Input PF2 from the third film switch swFLM3.

Step S311: Test PF2=0. If the cycle of film winding operation is not completed yet, PF2=1. So advance to step S312.

Step S312: Set the constant K in the timer register again, causing the timer RMR to start so that interruption is enabled.

Step S313: Return to the original program under execution. The timer interrupt operation is to turn away from the program under execution to going for testing the states of the three film switches swFLM1, swFLM2 and swFLM3 in every certain time. Since the program itself goes with the instructions each of which is executed at a very high speed, the recycling of the input of film winding up information in the certain period does not actually give rise to a problem.

Now assuming that a certain cycle of execution of the timer interrupt operation is encountered with opening of the first film switch swFLM1, then jump from step S303 to step S314.

Step S314: Test flag F3=1. Since F3=0 has been set in step S237, advance to step S315.

Step S315: Test flag F2=1. Since F2=0 has been set in step S237, advance to step S316.

Step S316: Set flag F2 to "1". This means that the first film switch swFLM1 has turned off, in other words, the input PF0 has changed to "1".

Step S317: Set again the internal register RG2 to the constant M. Then, jump to beginning of the aforesaid subroutine with step S308. Here, for a little while, the winding-up is carried out. Suppose a moment just before the terminal end of one-frame movement of the film. Since, at this time, the second film switch swFLM2 turns on, PF1=0 appears, causing step S309 to be followed by step S318.

Step S318: Set flag F3 to "1". In the subsequent cycle of execution of the timer interrupt operation, therefore, a jump to step S319 occurs at step S314.

Step S319: Set PB0=1. Since PB1=1 has been set in step S235, the windup motor M2 is deenergized, and, at the same time, braked. But inertia does not allow the motor M2 to stop immediately. So it continues rotating. By the subsequent cycle of execution of the timer interrupt operation, as the first film switch swFLM1 changes from OFF to ON, step S303 is followed by step S304. Since PB0=0 takes place again, the motor M2 is energized for the second time. Since, at this time, F2=1 as has already been set in step S316, advance to Step S320.

Step S320: Set flag F2 to "0", and then jump back to step S3117 where the constant M is set in the internal register RG2. In conclusion, after the second film switch swFLM2 turns on, that is, the winding up nears completion, as the ON-and-OFF operation of the first film switch swFLM1 recycles, the motor M2 is put under duty control to repeat driving-braking-driving-braking and so on. Thus, it is being decelerated.

When the cycle of film winding operation has been completed, the third film switch swFLM3 is turned on. So, a jump from step S3111 to step S321 takes place.

Step S321: Brake the motor M2 as in step S319.

Step S322: Set flag F1 to "0", which represents the termination of the film winding operation. Then, jump back to step S313 where the subroutine transits to the original program. Because step S312 is not in the path, no more interruption occurs.

Next assuming that the used film is of 24-exposure length, and the 24th frame has just been exposed, then energization of the motor M2 will only result in tension of the film. So, the first film switch swFLM1 can no longer turn on and off, causing the flag F2 to be left unchanged from "0" or "1". In step S306, therefore, the content of the internal register RG2 is subtracted by "1" in each cycle of execution of the timer interrupt operation. When RG2=0 is reached in some cycle number, a jump from step S307 to step S323 takes place.

Step S323: Set PB0=PB1=0, causing both ends of the winding of the motor M2 to open.

Step S324: Set flag F0=1, which represents the film end.

The above-described loop beginning with the step S237 of the main routine is executed always until the next shot goes to step S215. Thus, the film winding operation is controlled accurately.

The remain of the main program routine will be explained.

Step S238: Input a signal representing that the shutter, mirror and automatic diaphragm have been charged from the charge switch swCGE.

Step S239: A routine comprised together with step S238 for waiting until the charging is completed. Of course, during this time, a necessary number of cycles of timer interrupt operation are carried out.

Step S240: Change PD0 output to "1", causing the charge motor M1 to be braked.

Step S241: Test the flag F0 which represents the film end. Now suppose the film is not all exposed, then advance to step S242.

Step S242: Similar to step S202.

Step S243: If the photographer continues pushing the release button with intension of shooting in the continuous run mode, the second stroke switch sw2 remains ON, so that the PA inputs have a hexadecimal number of [00H], causing a jump back to step S206: NEXT.

With the step S206, as has been described above, the photographing sequence begins. It should be pointed out here that without making determination of when the film winding operation is terminated, step S208 is executed to activate the first latch control solenoid MG0. In fact, the preparation for an exposure or the adjustment of the diaphragm to the presetting and the upward movement of the mirror, is carried out regardless of whether or not the film winding operation in the preceding shot is terminated, thereby giving an advantage that the firing rate of shots is increased. After that, the termination of upward movement of the mirror is determined in step S212, and the termination of the film winding operation is determined in step S214. Until now, the timer interrupting is repeated any number of times. Upon detection of the termination of the film winding operation, advance to the next step for shutter control.

Next explanation is given to the single frame shooting mode. Since, after each shot, the photographer must have continued pushing the release button in the second stroke, step S243 is followed by step S244.

Step S244: Test the completion of the winding by the timer interrupt operation, or F1=0. If not, repeat steps S241 to S244. Upon completion of the winding, jump back to step S201: START. In step S204, the battery voltage Vcc is then released from the latching. If the first stroke switch sw1 also is OFF, the supply of the voltage Vcc is cut off.

Film Rewinding Operation

When the film is tensioned at an intermediate point during the winding operation, the execution of the timer interrupt operation results in F0=1, causing the flow to be branched from step S241 to step S245.

Steps S245-S247: Energize the solenoid MG2 for a certain time, causing the trailing curtain to run down as in steps S228 to S230. This is because the film is protected against fogging when it happens that the photographer while having carelessly taken the lens off the camera body and been exposing the shutter to strong light, carried out the rewinding. Since both of the leading and trailing curtains are present in front of the exposure aperture, the strong light can be shut out perfectly from the film surface.

Step S248: Input a signal from the trailing curtain switch swCN2.

Step S249: Wait for the completion of running down of the training curtain. Upon completion, then advance to step S250.

Step S250: A constant M0 is set at the internal register RG2.

Step S251: The ports PB0 and PB1 are set respectively at PB0=0 and PB1=1. The film windup motor M2 is caused to rotate clockwise. The windup transmission system K2 is shifted to a smaller reduction ratio.

Step S252: A given period of waiting time is created by means of a timer.

Step S253: The port PB1 is set at PB1=0. Connection between terminals of the windup motor M2 is opened.

Step S254: A given period of waiting time is created by means of a timer.

Step S255: From the content of the internal register RG2, "1" is subtracted.

Step S256: The steps S251 to S256 are repeated a number of times determined by the constant M0, that is, until the content of the internal register RG2 becomes zero. A duty control process for current supply→opening between terminals→current supply→opening between terminals is performed over the film windup motor M2. The motor M2 rotates clockwise with a weak torque. The planetray lever 219a (see FIG. 4) turns round counterclockwise. The large gear 205a comes to directly engage the spool gear 210 to try to cause the spool structure 22 to rotate in the film winding direction. However, even if the film is then in a stretched state, no excessive tension is applied to the film by virtue of the duty control. The same effect is also attainable by lowering a voltage between the terminals of the windup motor M2.

The reliability of the engagement between the large gear 205a and the spool gear 210 can be increased by repeating the steps S251 to S256, because: When the planetary lever 219a turns counterclockwise, the large gear 205a might be hindered from adequately engaging the spool gear 210 by collision and rebounding which then takes place between the gears 205a and 210. However, the repeated performance of the steps S251 to S256 repeated a predetermined number of times ensures adequate engagement of these gears.

Steps S257: The ports PC0 and PC1 are set at PCO=0 and PC1=1. A current is supplied via the driving circuit DR3 to the rewind motor M3. Film rewinding then begins.

Steps S258 to S264: These steps are exactly the same as the steps S251 to S256. The windup motor M2 is duty controlled. The rewind motor M3 and the windup motor M2 are simultaneously energized to pull each other through the film. This further ensures reliable engagement between the large gear 205 and the spool gear 210. This state of engagement is maintained throughout the film rewinding process. The operation proceeds to a step S265.

Step S265: A predetermined period waiting time is crated by means of a timer. The film might be moved in the winding direction by the duty driving action of the windup motor M2. Therefore, this steps provides for a stabilization waiting time.

Step S266: The internal register RG1 receives 0. The internal register RG1 performs a function corresponding to that of the film moving extent measuring means 405 of FIG. 12.

Step S267: A constant M1 is supplied to the internal register RG2. The internal register RG2 corresponds to the timer means 406 of FIG. 12. Other constants M2, M3 and M4 which will be described later are also to be set at the internal register RG2 and are arranged to define different timer time values together with the constant M1. They are in a relation of M1>M2>M3>M4. The timer time which is obtained by the constant M1 is sufficiently long for allowing the film to tighten its coiled state within the film cartridge. The timer time obtained by the constant M4 is shorter than a minimum length of time required for pulling the leader part of the film into the cartridge after its disengagement from the sprocket.

Steps S268 to S271: The input port PF0 receives information on the state of the first film switch swFLM1. The input is stored at the flag F2.

Steps S272 and S273: Again the information on the first film switch swFLM1 is received. The operation comes to a next step S274 if the switch is in an ON state or comes to a step S275 if it is in an OFF state.

Steps S274 and S275: If the state of the first film switch swFLM1 remains the same as the state obtained at the step S268, the operation proceeds to a step S276. If not, the operation comes to a step S278 or S279.

Step S276: The value of the internal register RG2 is decreased by "1".

Step S277: The operation comes back to the step S272 if the value of the internal register RG2 is not zero and proceeds to a step S286 if it is zero.

In the steps S272 to S277, the state of the first film switch swFLM1 is thus compared with the value of the flag F2. If they are found equal to each other, the loop of these steps S272 to S277 is repeated by subtracting "1" from the value of the internal register RG2 every time the loop is repeated. In other words, the changes of the state of the first film switch swFLM1 is kept under surveillance during the timer time set at the step S267. During this period, the rewind motor M3 rotates to tighten the coiled portion of the film within the cartridge until the film comes to move. When the film begins to move, the state of the first film switch swFLM1 changes. The operation then either comes to a step S278 or branches out to a step S279. If the film remains stationary during the timer time defined by the constant M1, the value of the internal register RG2 eventually becomes zero at the step S277. In that event, the operation comes to a step S286.

Steps S278 and S279: The value of the flag F2 is adjusted to the state of the first film switch SwFLM1 obtained at the step S272.

Step S280: The value of the internal register RG1 is compared with zero. Since the value has been set at zero already at the step S266, the operation branches out to a step S281.

Step S281: The constant M2 is stored at the internal register RG2. By this step, the timer time defined by the constant M1 is changed over to the timer value defined by the constant M2.

Step S282: To the value of the internal register RG1 is added "1 ". By this the internal register which has been at zero becomes RG1=1. This value indicates that the film has moved to an extend corresponding to one occurrence of change in the state of the first film switch swFLM1. The operation comes back to the step S272 to repeat the control process of the steps S272 to S279. Then, since the constant M2 has been set at the internal register RG2, the length of waiting time for the change of the first film switch swFLM1 is shortened. When the state of the first film switch swFLM1 again comes to change, the operation comes to the step S280. The value of the internal register RG1 is compared with zero. Since the value of the internal register RG1 has already become "1" at the step S282, the operation proceeds to a step S283.

Step S283: The value of the internal register RG1 is compared with "5". Since the value of the register RG1 is "1", the operation branches out to a step S284.

Step S284: The constant M3 is stored at the internal regiser RG2 to further shorten the timer time thereby. Then, again "1" is added to the value of the internal register RG1 at the step S282 and the loop of the steps S272 to S277 is resumed. The operation waits for change-over of the state of the first film switch swFLM1 for the timer time defined by the constant M3 this time. Since the change-over time of the state of the first film switch swFLM1 becomes shorter according as film moving speed accelerates, the timer time is thus shortened stepwise by changing the constants M1, M2 and M3 one after another.

The value of the internal register RG1 increases by "1" every time the state of the first film switch swFLM1 changes from one state over to the other. However, during a period before the value of the internal register RG1 becomes "4" from "1", there obtains the timer time given by the constant M3.

The moving speed of the film becomes constant when the film rewinding process stabilizes. Then, the first film switch swFLM1 comes to change from one state over to the other at constant intervals. When the state of the first film switch swFLM1 changes a sufficient number of times for stabilization of the rewinding process, say, five times, the operation comes from the step S283 to a step S285.

Step S285: The constant M4 is stored at the internal regiser RG2. The timer time the becomes the shortest length of time. After that, every time the state of the first film switch swFLM1 changes with the film rewound, the constant M4 is stored at the internal register RG2.

The film is rewound further with the control process of the steps S272 to S285 repeated. The leader part of the film eventually comes to disengage from the sprocket. Then, the state of the first film switch swFLM1 ceases to change.

The value of the internal register RG2 is decremented one by one and reaches zero when the loop of steps S272 to S277 is repeated a number of times determined by the constant M4. The flow of operation then proceeds to a step S286.

Step S286: The rewind motor M3 is brought to a stop. At that moment, it is only the timer time defined by the constant M4 that has elapsed after the last occurrence of change-over of the state of the first film switch swFLM1. Therefore, the motor M3 comes to a stop before the leader part of the film is taken up into the cartridge. The film rewinding action comes to an end with the leader part of the film left outside of the film cartridge.

Step S287: The flag F0 indicating the end of the film is reset at "0".

Step S288: The ports PD0 and PD1 are set at PD0=0 and PD1=1. This causes the charge motor M1 to rotate, because: Before film rewinding, the trailing shutter curtain has been allowed to travel at the step S245 and, therefore, the shutter device must be brought back into a charging completed state.

Step S289: A signal is received from the charge switch swCGE.

Step S290: The flow of operation proceeds to a step S291 after completion of the charging process.

Step S291: The rotation of the charge motor M1 is brought to a stop. The film rewinding process is completed by this. The flow of operation the comes back to the START step S201.

In case that, during a continuous photographing operation, the charging action on the shutter, the mirror and the automatic aperture control device is quickly completed before the end of film winding and that the film comes to its end after the first clamping magnet MG0 is energized for a next photographing shot by the process of the steps S208 to S210, the embodiment operates as follows:

In this instance, the mechanical release action has already been initiated by the first clamping magnet MG0. Therefore, an aperture stopping-down action and a mirror uplifting action are performed. Meanwhile, the movement of the film comes to a stop halfway during the process of film winding and cannot be wound any further. The third film switch swFLM3, therefore, remains in an OFF state. Then, if the film is rewound under that condition, the photographer might mistake the state of the shutter for an open state and thus might perform an erroneous operation on the camera. Further, in the event of accidentally allowing an intense light flux to be incident on the film through the lens, the film might has fogging. To avoid these troubles, the film is preferably rewound after the mirror is brought down to its lowered position.

The uplifted state of the mirror is confirmed at the step S212. After that, if the end of the film is detected during the time interrupt process performed while waiting for completion of film winding at the steps S213 and S214, the flow of operation branches out from the step S213 to a step S292 for setting the flag F0 at "1" in a step S324.

Step S292: The port PD0 and PD1 are changed into states of PD0=0 and PD1=1. This causes the charge motor M1 to rotate.

Steps S293 to S294: Completion of the charging action is detected.

Step S295: A brake is applied to the charge motor M1 by setting the state of the port PD0 at "1". The mirror is then charged and brought down to its initial position. The flow of operation then jumps to the RWND step S245 to have a film rewinding action performed.

The second embodiment of this invention is thus provided with the film moving extent measuring means which is arranged to measure the extent of movement of the film on the basis of the output of the detecting means for detecting the movement of the film; and the timer means which is arranged to shorten, in accordance with the a measured value obtained by the measuring means, the timer time used by the flim stop detecting means and to adjust, when the measured value comes to exceed a predetermined value, the timer time to a length of time within the leader part of the film never be taken up into the film cartridge. The timer time is thus arranged to become shorter according as the film movement accelerates. After stabilization of the film moving speed, the timer time is adjusted to a length of time within which the leader part of the film never comes to be pulled into the film cartridge during film rewinding. The embodiment is, therefore capable of film rewinding without causing the leader part of the film to be pulled into the cartridge.

What is claimed is:

[1. A camera with a motorized film rewinding device and a photo-taking lens, comprising:

(a) a motor, (b) a film rewinding force transmission system driven by said motor as a drive source, (c) a film winding spool;

(d) a camera body having, on alternate sides of said phototaking lens, an area in which said spool is disposed and another area in which a film cartridge is to be disposed;

(e) detection means for detecting completion of film rewinding, a detecting part of said detection means being disposed in between said spool disposing area and said film cartridge disposing area;

(f) control means for automatically bringing the operation of said motor to a stop, said control means including:

(f-1) first control means for bringing the operation of said motor to a stop after the lapse of a first predetermined period of time from a point of time when completion of film rewinding is detected by said detection means, said first predetermined period of time being set at a length of time for effecting take-up of the leader part of said film into said film cartridge; and (f-2) second control means for bringing the operation of said motor to a stop after the lapse of a second predetermined period of time from a point of time when completion of film rewinding is detected by said detection means, said second predetermined period of time being set at a length of time effecting take-up into said film cartridge except for the leader part thereof said first time period being greater than said second time period; and (g) selection means for selecting as operative either said first control means or said second control means of said control means.]

[2. A camera according to claim 1, wherein said film includes perforations along the length thereof and wherein said detecting part of said detection means is arranged to generate a film movement signal by detecting movement of such film perforations, and wherein said detection means is arranged to detect completion of film rewinding when said film movement signal ceases to be generated with the leader part of said film moved by the force of film rewinding from the position of said detecting part toward said film cartridge disposing area.]

[3. A camera according to claim 2, wherein a rotary detection wheel is employed as said detecting part of said detection means.]

[4. A camera with a motorized film rewinding device and a photo-taking lens, comprising:

(a) a film winding force transmission system driven by a motor as a drive source, said transmission system including a film winding spool;

(b) a film rewinding force transmission system driven by a motor as a drive source;

(c) a camera body having, on alternate sides of said phototaking lens, an area in which said spool is disposed and another area in which a film cartridge is to be disposed;

(d) film winding completion detecting means for detecting completion of film winding including all the frame portion of film, a detecting part of said film winding completion detecting means being arranged in between said spool disposing area and said film cartridge disposing area;

(f) rewinding completion detecting means for detecting of completion of film rewinding, said rewinding completion detecting means being arranged to include as a component thereof said detecting part of said film winding completion detecting means;

(g) change-over means for changing from a film winding driving action over to a film rewinding driving action;

(h) control means arranged to automatically bring the operation of said motor for said film rewinding force transmission system to a stop after change-over by said change-over means to said film rewinding drying action, said control means including;

(h-1) first control means for bringing the operation of said motor for said film rewinding force transmission system to a stop after the lapse of a first predetermined period of time from a point of time when completion of film rewinding is detected by said rewinding completion detecting means, said first predetermined period of time being set at a length of time which expires after the leader part of film is taken up into said film cartridge; and (h-2) second control means for bringing the operation of the motor for said film rewinding force transmission system to a stop after the lapse of a second predetermined period of time from a point of time when completion of film rewinding is detected by said rewinding completion detecting means, said second predetermined period of time being set at a length of time which expires before the leader part of said film is taken up into said film cartridge; and (i) selection means for selecting as operative either said first control means or said second control means of said control means.]

[5. A camera according to claim 4, wherein said film includes perforations along the length thereof and wherein said detecting part to be used in common by said two detecting means is arranged to generate a film movement signal by detecting movement of such film perforations, and wherein said two detecting means are arranged to detect completion of film winding and film rewinding when said detecting part ceases to generate said film movement signal any longer.]

[6. A camera according to claim 5, wherein a rotary detection wheel is employed as said detecting part.]

7. A camera with a motorized film rewinding device, comprising:

(a) a motor;

(b) a film rewinding force transmission system driven by said motor as a drive source;

(c) motor driving action initiating means for causing said motor to begin a perform a driving action;

(d) detection means for detecting the rewinding movement of film;

(c) rewinding film moving extent measuring means for measuring the moving extent of said film on the basis of the output of said detection means; and (f) control means for automaticlaly bringing the driving action of said motor to a stop when no rewinding movement of said film is detected within a predetermined length of time time after commencement of said driving action of said motor caused by said motor driving action initiating means, said control means being arranged to automatically bring the driving action of said motor to a stop when the rewinding movement of said film remains undetected by said detection means before the end of said predetermined length of said timer time which is set to be long for the beginning of a film rewinding action, to shorten said timer time according to a measured value obtained from said rewinding film moving extent measuring means and, when said measured value comes to exceed a predetermined value, to set said timer time at a length within which the leader part of said film does not come to be taken up into a film cartridge.

8. A camera according to claim 7, wherein said film includes perforations along its length and wherein said detection means includes a detecting part arranged to generate a film movement signal by detecting the movement of said film perforations.

9. A camera accoording to a claim 8, wherein a rotary detection wheel is employed as said detecting part.

10. A motorized film rewinding device for a camera having a rewinding motor, control means for controlling the driving action of said motor, detecting means for detecting the movement of film and film stoppage discriminating means for causing said control means to bring the driving action of said motor to a stop by detecting stoppage of said film when the output state of said detecting means shows no change even after the lapse of a predetermined length of timer time, comprising:

film moving extent measuring means arranged to measure a moving extent of said film on the basis of the output of said detecting means; and timer means arranged to shorten the length of said timer time used by said film stoppage discriminating means according to a measured value obtained by said film moving extent measuring means and further to set said time time, when said measured value comes to exceed a predetermined value, at a length of time which expires before the leader part of said film is taken up into a film cartridge.

[11. In a camera having a film cartridge support and a film winding spool support, a film rewinding force transmission unit and a motor for driving said transmission unit, a control system comprising:

(a) detection means for detecting a condition of the completion of the rewinding of said film from said film winding spool and providing output indication thereof;

(b) switch means settable in first or second states and providing first or second output indication respectively for indicating whether rewinding of said film should provide for the rewinding of said film fully into said film cartridge or the rewinding of said film partially into said film cartridge with a leader thereof extending outwardly of said film cartridge; and (c) control means operably responsive to said detection means output signal and to the state of said switch means for (c-1) discontinuing operation of said motor in a film rewinding operation, when said switch means output indication is such first state indication, at the expiration of a first time period following such output indication by said detection means, thereby to effect such rewinding of said film fully into said film cartridge; and (c-2) discontinuing operation of said motor in a film rewinding operation, when said switch means output indication is such second state indication, at the expiration of a second time period following output indication by said detection means, thereby to effect such rewinding of said film partially into said film cartridge with such leader thereof extending outwardly of said film cartridge, said second time period being less than said first time period.]

*12. A camera with a motorized film rewinding device, comprising:*

*(a) a motor;*

*(b) film rewinding means for rewinding a film and having said motor as a drive source,*

*(c) detecting means operative for detecting the rewinding movement of said film and producing a signal upon detection of such rewinding movement; and*

*(d) control means for automatically stopping said motor responsively to operation of said detecting means, said control means stopping said motor when said signal is not detected within a first time under an initial condition of said film rewinding and stopping said motor when the signal is not detected within a second time different from said first time so as to prevent a leader part of said film from being entangled in a film cartridge.*

*13. A camera according to claim 12, wherein a detecting part of said detecting means is disposed between a spool disposing area and a film cartridge area.*

*14. A camera according to claim 12, wherein said signal representing the movement of said film is produced along during a winding movement of said film.*

*15. A camera according to claim 12, wherein said detecting means includes a rotation member which rotates upon said rewinding movement of said film and produces said signal by such rotation.*

*16. A film rewinding device, comprising:*

*(a) a motor;*

*(b) film rewinding means for rewinding a film and having said motor as a drive source,*

*(c) detecting means operative for detecting the rewinding movement of said film and producing a signal upon detection of such rewinding movement; and*

*(d) control means for automatically stopping said motor responsively to operation of said detecting means, said control means stopping said motor when said signal is not detected within a first time under an initial condition of said film rewinding and stopping said motor when the signal is not detected within a second time different from said first time so as to prevent a leader part of said film from being entangled in a film cartridge.*

*17. A device according to claim 16, wherein a detecting part of said detecting means is disposed between a spool disposing area and a film cartridge area.*

*18. A device according to claim 16, wherein said signal representing the movement of said film is produced also during a winding movement of said film.*

*19. A device according to claim 16, wherein said detecting means includes a rotation member which rotates upon said rewinding movement of said film and produces said signal by such rotation.*

*20. A device according to claim 16, wherein said second time is shorter than said first time.*

*21. A camera with a film rewinding device, comprising:*

*(a) a moving member;*

*(b) film rewinding means for rewinding a film by a movement of said moving member;*

*(c) detecting means operative for detecting the rewinding movement of said film and producing a signal upon detection of such rewinding movement; and*

*(d) control means for automatically stopping said moving member responsively to operation of said detecting means. said control means stopping said moving member when said signal is not detected within a predetermined time so as to prevent a leader part of said film from being entangled in a film cartridge, and said control means not stopping said moving member when said signal is not detected within said predetermined time under an initial condition of said film rewinding.*

*22. A camera according to claim 21, wherein a detecting part of said detecting means is disposed between a spook disposing area and a film cartridge area.*

*23. A camera according to claim 21, wherein said signal representing the movement of said film is produced also during a winding movement of said film.*

*24. A camera according to claim 21, wherein said detecting means includes a rotation member which rotates upon said rewinding movement of said film and produces said signal by such rotation.*

*25. A camera according to claim 21, wherein said control means stops said moving member when said signal is not detected within a specific time longer than said determining time under said initial condition of said film rewinding.*

*26. A camera with a motorized film rewinding device, comprising:*

*(a) a motor;*

*(b) film rewinding means for rewinding a film and having said motor as a drive source,*

*(c) detecting means operative for detecting the rewinding movement of said film and producing a signal upon detection of such rewinding movement; and*

*(d) control means for automatically stopping said motor responsively to operation of said detecting means, said control means stopping said motor when said signal is not detected within a first time under an initial condition of said film rewinding and stopping said motor when the signal is not detected within a second time shorter than said first time so as to prevent a leader part of said film from being entangled in a film cartridge.*

*27. A camera according to claim 26, wherein a detecting part of said detecting means is disposed between a spool disposing area and a film cartridge area.*

*28. A camera according to claim 26, wherein said signal representing the movement of said film is produced also during a winding movement of said film.*

*29. A camera according to claim 26, wherein said detecting means includes a rotation member which rotates upon said rewinding movement of said film and produces said signal by such rotation.*

* * * * *

UNITED STATES PATENT AND TRADEMARK OFFICE

CERTIFICATE OF CORRECTION

PATENT NO. : Re. 34,083

DATED : September 29, 1992

INVENTOR(S) : Masaharu Kawamura; et al.

Figure 9:
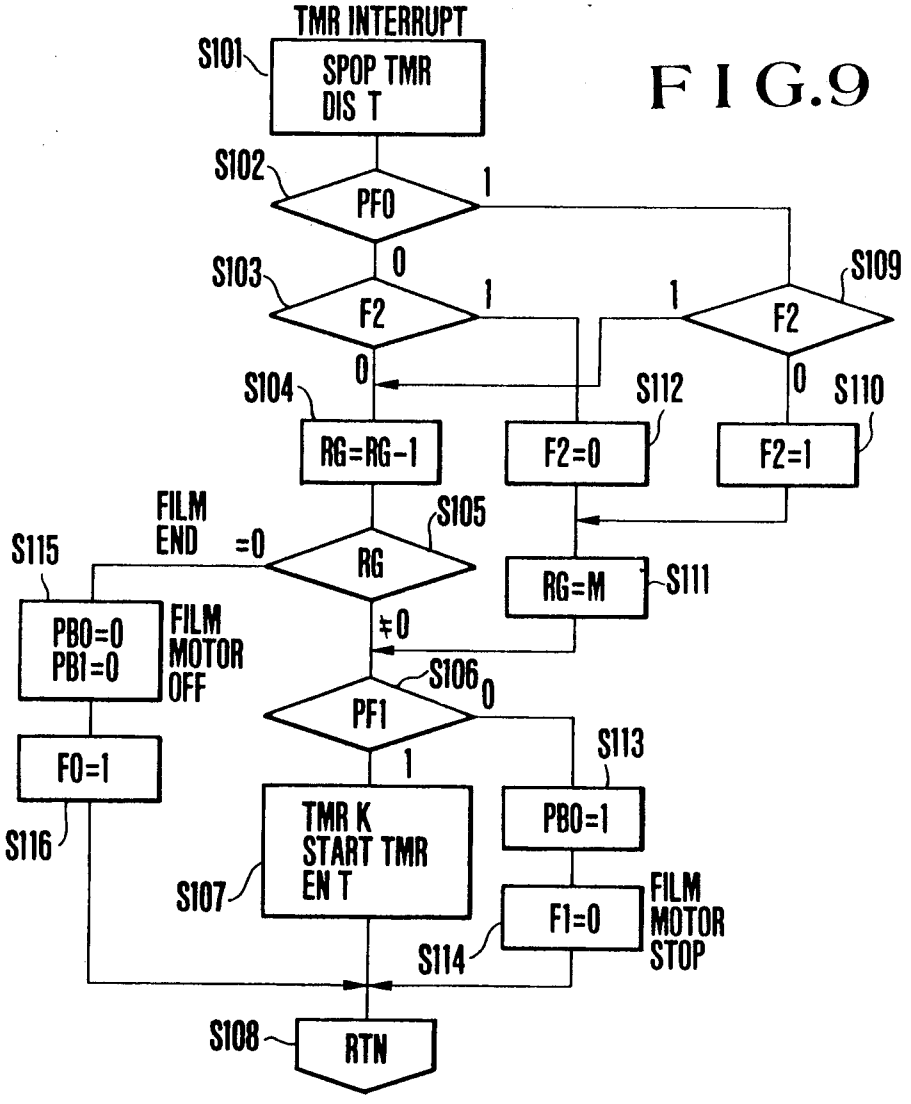
Figure 14A:
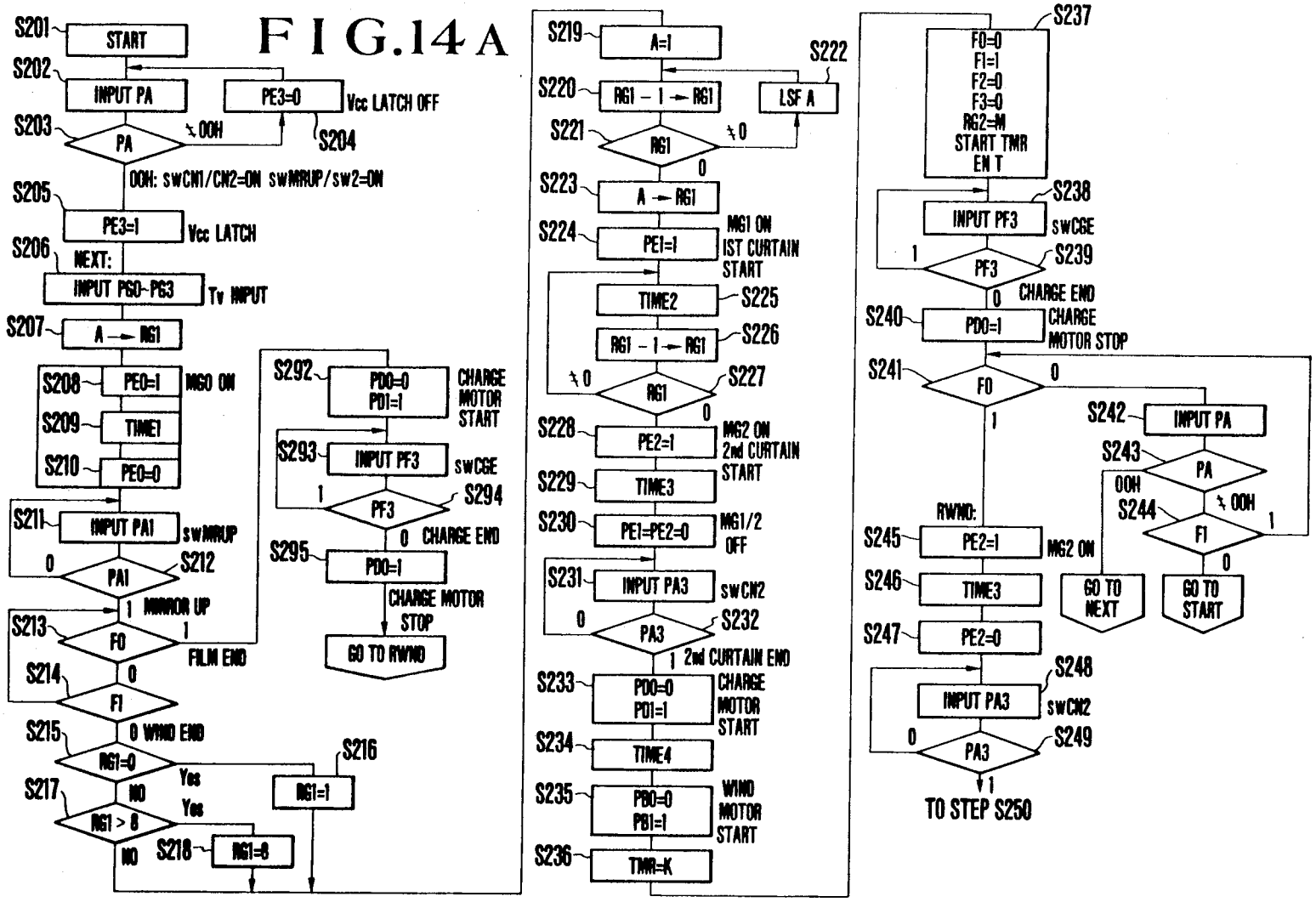
FIGS. 14A, 14B, 14C and 15 are flow charts.
Figure 14B:
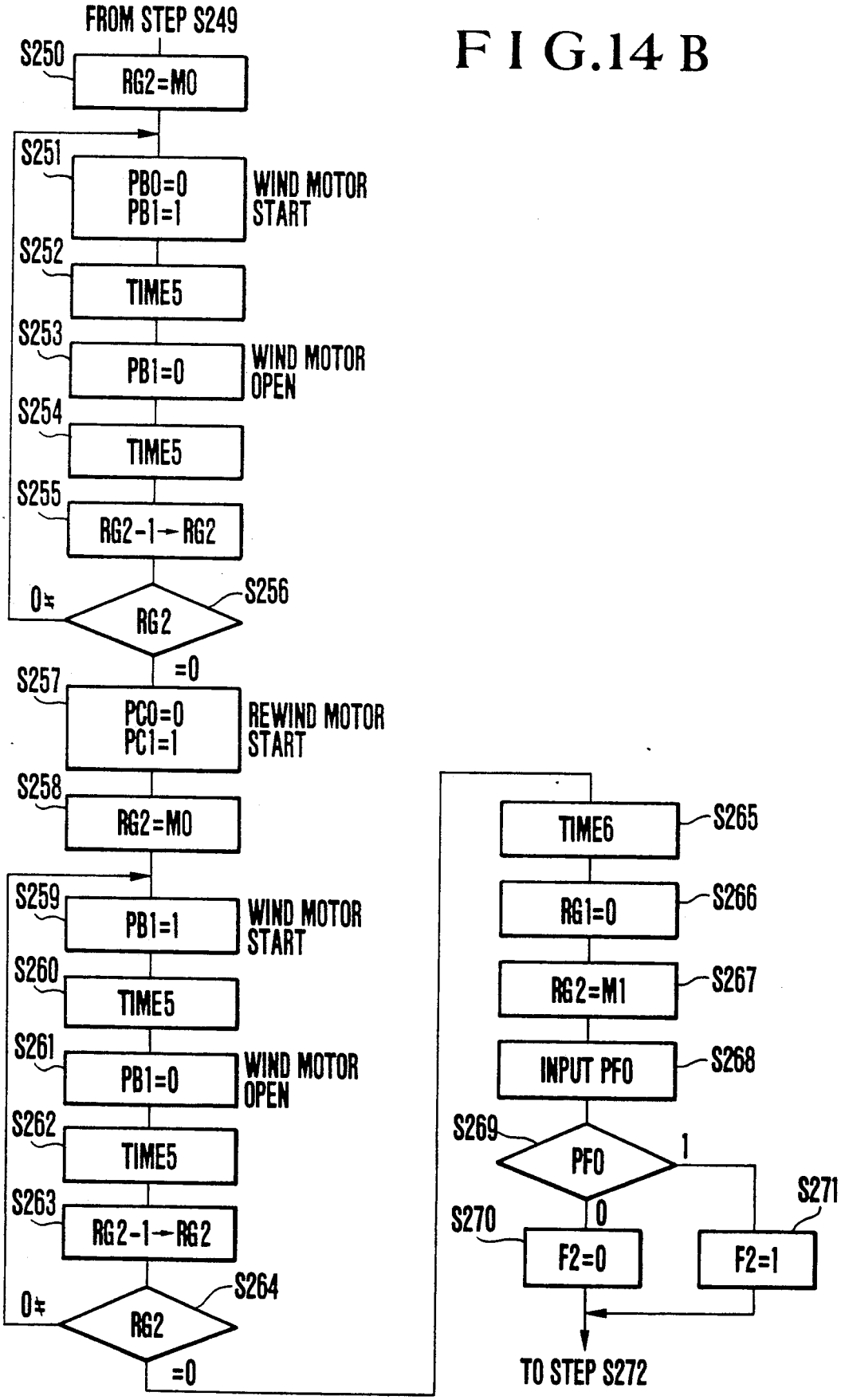
Figure 14C:
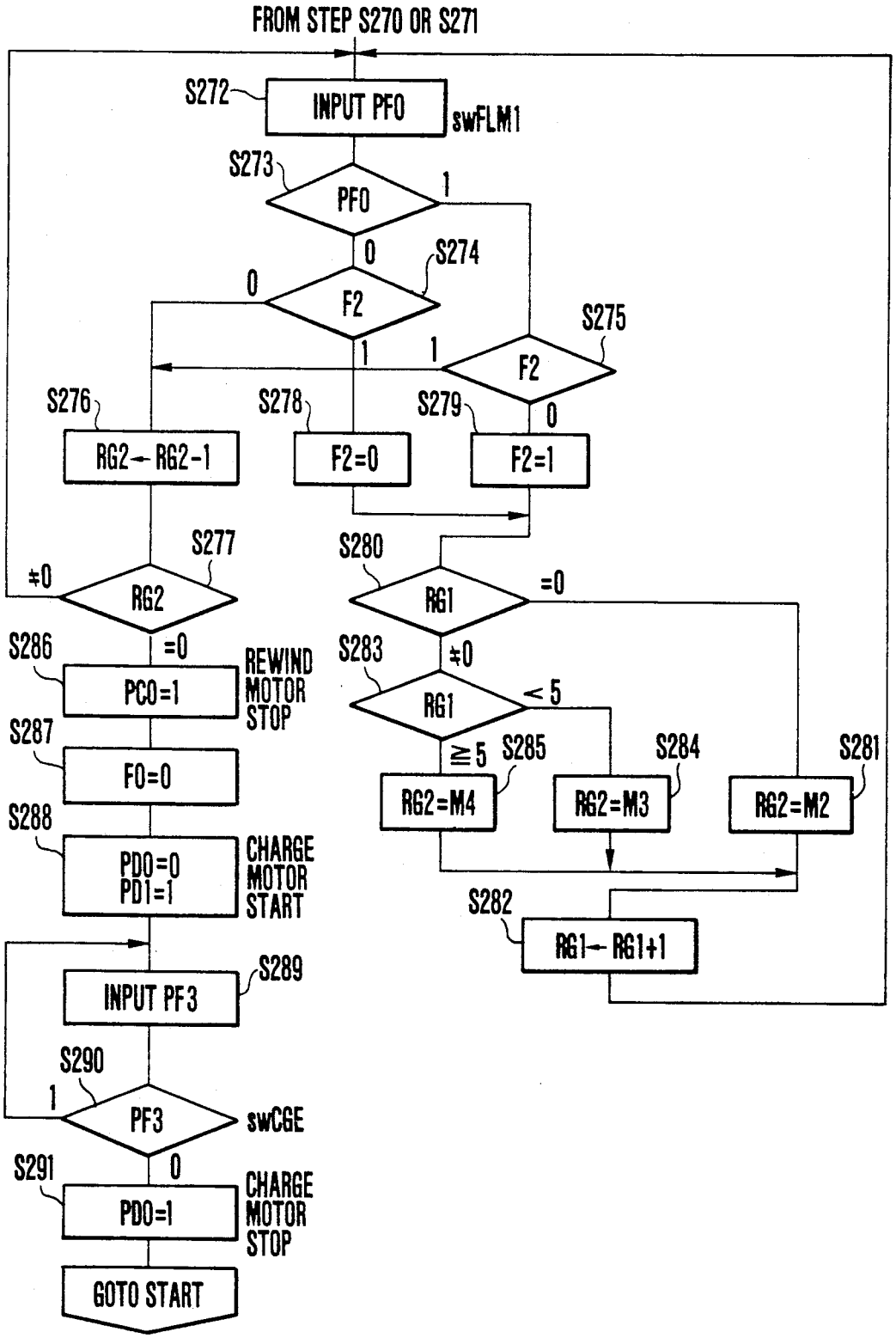
Figure 15:
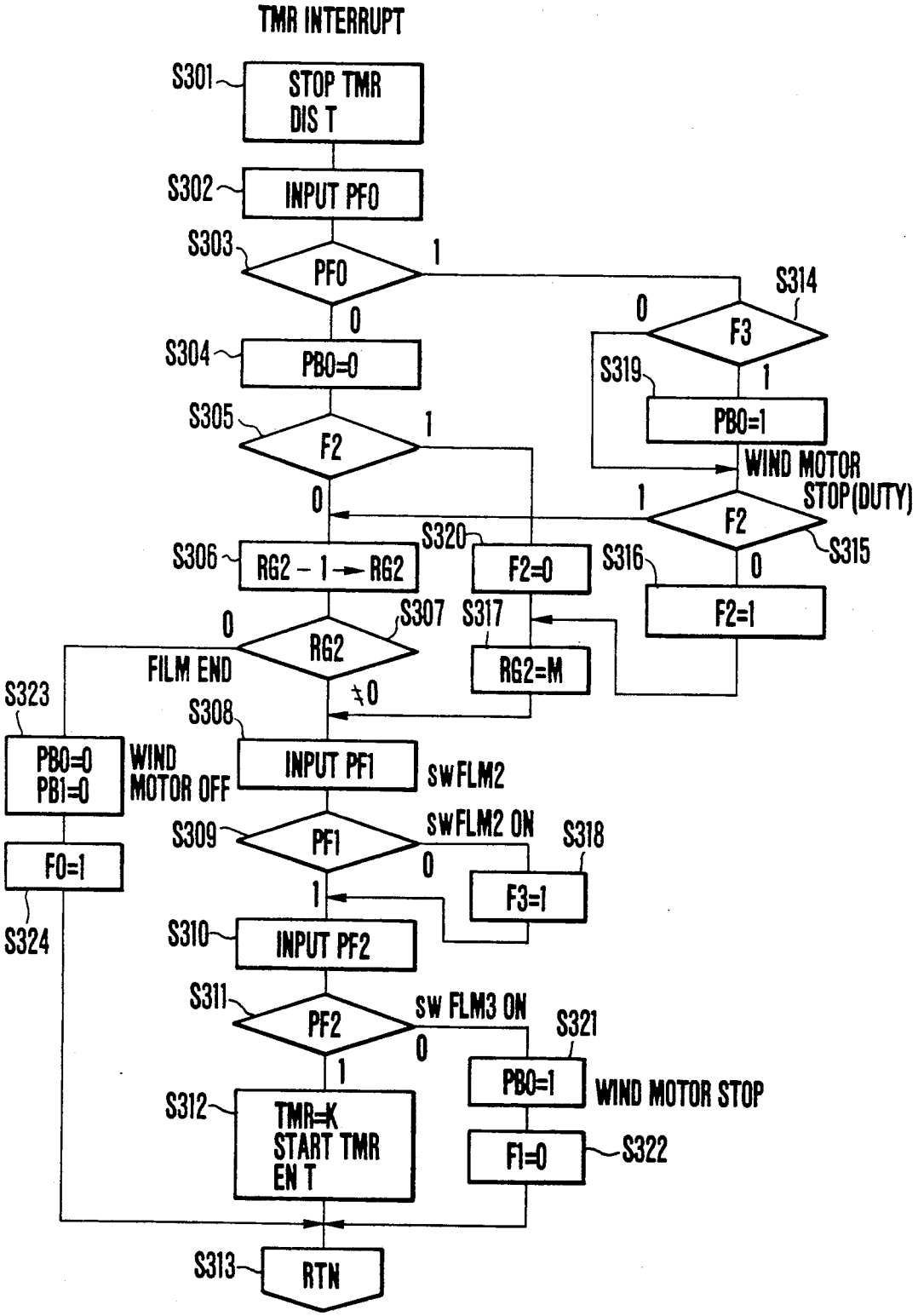

It is certified that error appears in the above-identified patent and that said Letters Patent is hereby corrected as shown below:

IN THE DRAWINGS, FIGURE 9. Change "SPOP" to -- STOP --,

FIGURE 14C. Change "GOTO START" to -- GO TO START --

Col. 1, line 51. Change "positions" to -- portions --

Col. 2, line 57. After "of" insert -- preventing any premature end erroneous detection of --

Col. 3, line 28. Change "mechanisms," to -- mechanism, --

Col. 6, line 17. Delete "p"

Col. 6, line 17. "Another" - start new paragraph

Col. 6, line 40. Change "numbers" to -- number --

Col. 7, line 13. Change "rotio" to -- ratio --

Col. 8, line 25. Change "therefore," to -- Therefore, --

Col. 8, line 30. Change "perform" to -- performs --

Col. 8, line 57. Change "AB" to -- AV --

Col. 10, line 68. Change "PES" to -- PE5 --

Col. 11, line 56. Change "beings" to -- begins --

Col. 11, line 57. Change "flat" to -- flag --

Col. 11, line 60. Change "poart" to -- port --

Col. 12, line 16. Change "ste" to -- Step --

Col. 14, line 60. Delete ","

Col. 14, line 66. Change "this" to -- This --

Col. 18, line 38. Change "proceed" to -- proceeds --

Col. 19, line 54. Change "PB)" to -- PBO --

Col. 19, line 61. Change "the" to -- and --

UNITED STATES PATENT AND TRADEMARK OFFICE

CERTIFICATE OF CORRECTION

PATENT NO. : Re. 34,083

DATED : September 29, 1992

INVENTOR(S) : Masaharu Kawamura, et al.

It is certified that error appears in the above-identified patent and that said Letters Patent is hereby corrected as shown below:

Col. 20, line 10. Delete "of"

Col. 21, line 45. Change "tier" to -- timer --

Col. 21, line 46. Change "fill" to -- film --

Col. 22, line 5. Change "inner" to -- timer --

Col. 22, line 65. After "optical" insert -- , --

Col. 23, line 13. Change "a" to -- an --

Col. 23, line 19. Change "BG1" to -- VG1 --

Col. 23, line 25. Change "Rv" to -- Tv --

Col. 23, line 51. Change "GBD" to -- GND --

Col. 24, line 42. Change "charged" to -- changed --

Col. 24, line 43. Change "th e" to -- the --

Col. 24, line 54. Change "numbers" to -- number --

Col. 25, line 27. Change "fill" to -- film --

Col. 26, line 38. Change "OFFR" to -- OFF --

Col. 27, line 67. After "Next" insert -- , --

Col. 28, line 18. Change "remain" to -- remainder --

Col. 28, line 35. Change "intension" to -- intention --

Col. 29, line 20. Change "training" to -- trailing --

Col. 29, line 43. Change "plantray" to -- planetary --

Col. 30, line 7. After "period" insert -- of --

Col. 30, line 8. Change "crated" to -- created --

Col. 30, line 10. Change "steps" to -- step --

Col. 31, line 10. Change "extend" to -- extent --

UNITED STATES PATENT AND TRADEMARK OFFICE

CERTIFICATE OF CORRECTION

PATENT NO. : Re. 34,083

DATED : September 29, 1992

INVENTOR(S) : Masaharu Kawamura, et al.

It is certified that error appears in the above-identified patent and that said Letters Patent is hereby corrected as shown below:

Col. 31, line 15. Change "register" to -- register --

Col. 31, line 34. Change "according" to -- accordingly --

Col. 31, line 54. Change "register" to -- register -- and change "the"(first occurrence) to -- then --

Col. 32, line 24. Change "the" to -- then --

Col. 33, line 5. Delete "the"

Col. 33, line 6. Change "flim" to -- film --

Col. 33, line 9. After "within" insert -- which --

Col. 33, line 11. Change "according" to -- accordingly --

Col. 34, line 21-22. Change "detecting" to -- detection --

Col. 34, line 33. Change "drying" to -- driving --

Col. 35, line 5. Change "a" to -- to --

Col. 35, line 14. Change "time" to -- timer --

Col. 35, line 35. Change "accoording" to -- according --

Col. 35, line 54. Change "time" to -- timer --

Col. 36, line 47. Change "along" to -- also --

UNITED STATES PATENT AND TRADEMARK OFFICE

CERTIFICATE OF CORRECTION

PATENT NO. : Re. 34,083

DATED : September 29, 1992

INVENTOR(S) : Masaharu Kawamura, et al.

It is certified that error appears in the above-indentified patent and that said Letters Patent is hereby corrected as shown below:

Col. 37, line 30. Change "spook" to -- spool --

Signed and Sealed this

Twenty-ninth Day of March, 1994

Bruce Lehman

*Attest:*

BRUCE LEHMAN

*Attesting Officer*

*Commissioner of Patents and Trademarks*